United States Patent
Zhang et al.

(10) Patent No.: US 11,025,368 B2
(45) Date of Patent: *Jun. 1, 2021

(54) PHYSICAL LAYER FRAME FORMAT FOR WLAN

(71) Applicant: Marvell World Trade Ltd., St. Michael (BB)

(72) Inventors: Hongyuan Zhang, Fremont, CA (US); Hui-Ling Lou, Sunnyvale, CA (US); Rohit U. Nabar, Sunnyvale, CA (US); Sudhir Srinivasa, Campbell, CA (US); Mao Yu, San Jose, CA (US); Raja Banerjea, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,116

(22) Filed: May 15, 2017

(65) Prior Publication Data

US 2017/0250785 A1    Aug. 31, 2017

Related U.S. Application Data

(63) Continuation of application No. 12/758,603, filed on Apr. 12, 2010, now Pat. No. 9,655,002.

(Continued)

(51) Int. Cl.
*H04L 1/00* (2006.01)
*H04L 27/26* (2006.01)
(Continued)

(52) U.S. Cl.
CPC ............ *H04L 1/0079* (2013.01); *H04L 1/009* (2013.01); *H04L 1/0072* (2013.01);
(Continued)

(58) Field of Classification Search
CPC ..... H04L 27/206; H04L 1/0079; H04L 69/18; H04L 1/0072; H04L 1/009;
(Continued)

(56) References Cited

U.S. PATENT DOCUMENTS 7,599,332 B2    10/2009    Zelst et al.
7,742,390 B2    6/2010    Mujtaba
(Continued)

FOREIGN PATENT DOCUMENTS

CN    101064544 A    10/2007
JP    2007509530 A    4/2007
(Continued)

OTHER PUBLICATIONS

"Draft Amendment to Standard for Information Technology—Telecommunications and information exchange between systems—Local and metropolitan area networks—Specific requirements-" IEEE P802.11n.™./D1.04, Sep. 2006, pp. 1-318.

(Continued)

*Primary Examiner* — Un C Cho
*Assistant Examiner* — Kenan Cehic

(57) ABSTRACT

A preamble of a physical layer (PHY) data unit that conforms to a first communication protocol is generated. The preamble includes a legacy field that is formatted according to a second communication protocol, and a signal field having a first orthogonal frequency division multiplexing (OFDM) symbol and a second OFDM symbol. The first OFDM symbol (i) immediately follows the legacy field and (ii) is modulated using binary phase shift keying (BPSK) modulation, whereas a third communication protocol specifies that an OFDM symbol, defined by the third communication protocol, that immediately follows the legacy field is modulated using BPSK modulation rotated by 90 degrees (Q-BPSK). The second OFDM symbol (i) immediately (Continued)

follows the first OFDM symbol and (ii) is modulated using Q-BPSK to indicate to a receiver device that conforms to the first communication protocol that the data unit conforms to the first communication protocol.

21 Claims, 23 Drawing Sheets

Related U.S. Application Data

(60) Provisional application No. 61/319,773, filed on Mar. 31, 2010, provisional application No. 61/252,290, filed on Oct. 16, 2009, provisional application No. 61/244,779, filed on Sep. 22, 2009, provisional application No. 61/241,760, filed on Sep. 11, 2009, provisional application No. 61/240,945, filed on Sep. 9, 2009, provisional application No. 61/240,604, filed on Sep. 8, 2009, provisional application No. 61/234,943, filed on Aug. 18, 2009, provisional application No. 61/233,440, filed on Aug. 12, 2009, provisional application No. 61/232,724, filed on Aug. 10, 2009, provisional application No. 61/229,900, filed on Jul. 30, 2009, provisional application No. 61/228,911, filed on Jul. 27, 2009, provisional application No. 61/227,360, filed on Jul. 21, 2009, provisional application No. 61/181,518, filed on May 27, 2009, provisional application No. 61/168,732, filed on Apr. 13, 2009.

(51) Int. Cl.
  *H04L 29/06* (2006.01)
  *H04W 28/06* (2009.01)
  *H04W 84/12* (2009.01)
  *H04W 99/00* (2009.01)

(52) U.S. Cl.
  CPC .......... *H04L 27/2613* (2013.01); *H04L 69/18* (2013.01); *H04W 28/06* (2013.01); *H04W 84/12* (2013.01); *H04W 99/00* (2013.01)

(58) Field of Classification Search
  CPC ..... H04L 27/2613; H04L 29/06; H04L 29/08; H04L 65/00; H04W 80/00; H04W 80/02; H04W 28/06; H04W 84/12; H04W 99/00; H04J 11/00; H04J 11/0083; H04J 2011/0096; H04J 2211/005; H04J 2211/003; H04J 11/0023; H04J 11/003
  See application file for complete search history.

(56) References Cited

U.S. PATENT DOCUMENTS

| | | | |
|---|---|---|---|
| 8,155,138 B2 | 4/2012 | van Nee | |
| 8,194,720 B2 | 6/2012 | Yamaura | |
| 8,270,909 B2 | 9/2012 | Zhang et al. | |
| 8,289,869 B2 | 10/2012 | Sawai | |
| 8,619,907 B2 | 12/2013 | Mujtaba et al. | |
| 8,976,674 B2* | 3/2015 | Pare, Jr. | H04L 27/0012 370/241 |
| 9,655,002 B2 | 5/2017 | Zhang et al. | |
| 9,712,358 B2* | 7/2017 | Zhang | H04L 27/2698 |
| 10,243,711 B1* | 3/2019 | Cao | H04L 5/0025 |
| 2006/0126545 A1* | 6/2006 | Nanda | H04B 17/309 370/310 |
| 2006/0187852 A1* | 8/2006 | Kwon | H04W 28/22 370/252 |
| 2006/0193340 A1 | 8/2006 | Jones et al. | |
| 2007/0189263 A1* | 8/2007 | Izumi | H04B 7/2681 370/350 |
| 2007/0232344 A1* | 10/2007 | Aoki | H04B 7/0874 455/522 |
| 2008/0109711 A1 | 5/2008 | Morioka et al. | |
| 2008/0181323 A1 | 7/2008 | Waters et al. | |
| 2008/0299962 A1 | 12/2008 | Kasher | |
| 2009/0109936 A1* | 4/2009 | Nagai | H04W 74/0808 370/336 |
| 2009/0196163 A1 | 8/2009 | Du | |
| 2010/0046656 A1 | 2/2010 | van Nee et al. | |
| 2010/0054368 A1 | 3/2010 | Feng et al. | |
| 2010/0248635 A1* | 9/2010 | Zhang | H04B 7/0413 455/63.1 |
| 2010/0260159 A1* | 10/2010 | Zhang | H04L 27/2613 370/338 |
| 2012/0014336 A1* | 1/2012 | Seok | H04L 5/0007 370/329 |
| 2013/0107990 A1* | 5/2013 | Zhang | H04L 27/2666 375/329 |
| 2013/0182593 A1* | 7/2013 | Zhang | H04L 29/02 370/252 |
| 2013/0272217 A1* | 10/2013 | Negus | H04L 5/14 370/329 |
| 2013/0286925 A1* | 10/2013 | Fischer | H04L 5/0023 370/312 |
| 2014/0078966 A1* | 3/2014 | Erceg | H04W 28/065 370/328 |
| 2014/0205029 A1* | 7/2014 | Srinivasa | H04L 27/2607 375/260 |
| 2014/0235270 A1* | 8/2014 | Zhang | G01S 5/021 455/456.1 |
| 2014/0362935 A1* | 12/2014 | Porat | H04L 27/2602 375/260 |
| 2015/0146708 A1* | 5/2015 | Lee | H04L 27/2613 370/338 |
| 2016/0050093 A1* | 2/2016 | Choi | H04B 7/0452 375/308 |
| 2016/0294594 A1* | 10/2016 | Takano | H04L 1/1854 |
| 2016/0330047 A1* | 11/2016 | Seok | H04L 5/0057 |

FOREIGN PATENT DOCUMENTS

| | | |
|---|---|---|
| JP | 200810904 A | 1/2008 |
| WO | WO-2005/039105 | 4/2005 |

OTHER PUBLICATIONS

IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).

Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).

Chen, "Home Network Basis: Transmission Environments and Wired/Wireless Protocols," Prentice Hall, pp. 1-26 (Jul. 2003).

European Search Report for European Application No. 14174964.8 dated Nov. 7, 2014 (5 pages).

Examination Report in EP Application No. 10 716 939.3 dated Mar. 18, 2013, 4 pages.

First Office Action in Chinese Application No. CN 201080017083.5 dated Sep. 22, 2013.

Hiertz et al., "The IEEE 802.11 Universe," IEEE Communications Magazine, pp. 62-70, (Jan. 2010).

(56) References Cited

OTHER PUBLICATIONS

IEEE P802.11™/D9.0, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 5: Enhancements for Higher Throughput, The Institute of Electrical and Electronics Engineers, Inc., Mar. 2009.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 Ghz Band," The Institute of Electrical and Electronics Engineers, Inc., 1999

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," The Institute of Electrical and Electronics Engineers, Inc., pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11:Wireless LAN Medium Access Control (MAC) and Physical Layer (PHY) specifications: High-Speed Physical Layer in the 5 Ghz Band," The Institute of Electrical and Electronics Engineers, Inc., (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., Nov. 7, 2001.

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," The Institute of Electrical and Electronics Engineers, Inc., pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., Apr. 2003.

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma D7.0), pp. 1-1212 (2006).

International Preliminary Report on Patentability in International Application No. PCT/US2010/030750 dated Oct. 27, 2011 (8 pages).

International Search Report and Written Opinion for PCT/US2010/030750, dated Jul. 20, 2010, 9 pages.

International Standard, ISO/IEC 8802-11, ANSI/IEEE Std 802.11, "Information technology Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., pp. 1-512 (1999).

Love et al., "An Overview of Limited Feedback in Wireless Communication Systems," IEEE J. on Selected Areas in Communications, vo. 26, No. 8, pp. 1341-1365 (Oct. 2008).

Non-Final Notice of Reasons for Rejection in Japanese Patent Application No. JP 2012-504920, dated Jan. 7, 2014.

Office Action in Korean Patent Application No. 10-2011-7024023, dated Dec. 16, 2015, with English translation (13 pages).

Mujtaba, "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).

Second Office Action in corresponding Chinese Patent Application No. 20108817083.5, dated Apr. 1, 2014.

Stacey et al., "Specification Framework for TGac," document No. IEEE 802.11-09/0992r13, Institute for Electrical and Electronics Engineers, pp. 1-20, Jul. 2010.

van Nee, et al. "The 802.11n MIMO-OFDM Standard for Wireless LAN and Beyond," Wireless Personal Communications, vol. 37, pp. 445-453 (Jun. 2006).

Zhang et al., "802.11ac Preamble," document No. IEEE 802.11-10/0070r0, Institute for Electrical and Electronics Engineers, pp. 1-11, Jan. 18, 2010.

\* cited by examiner

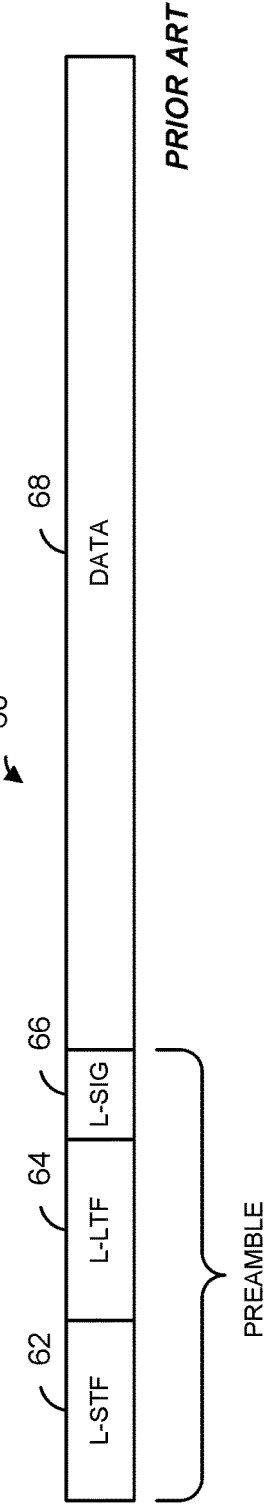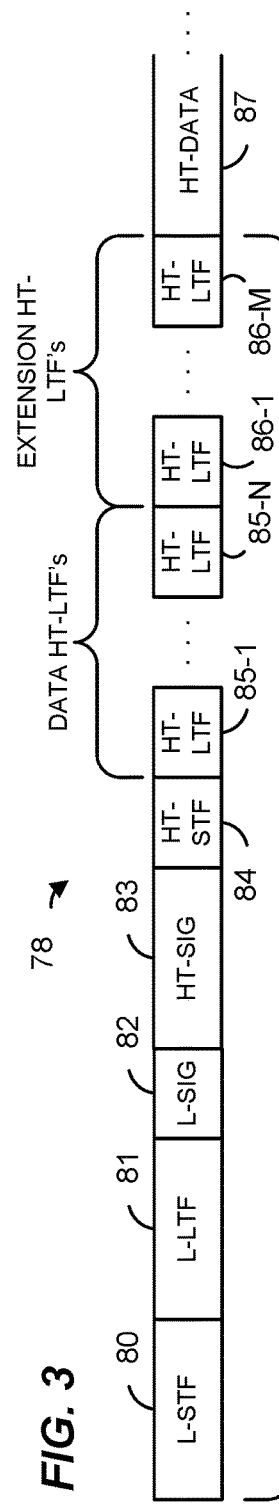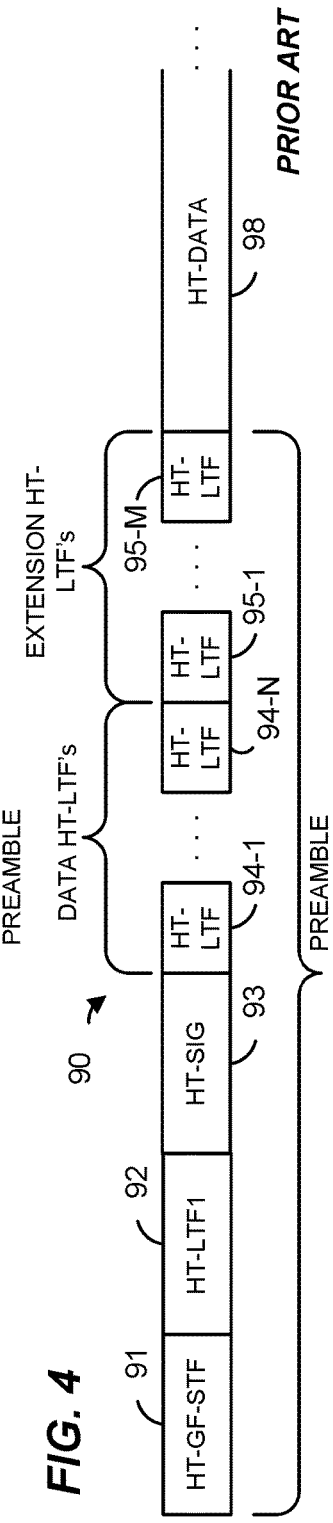

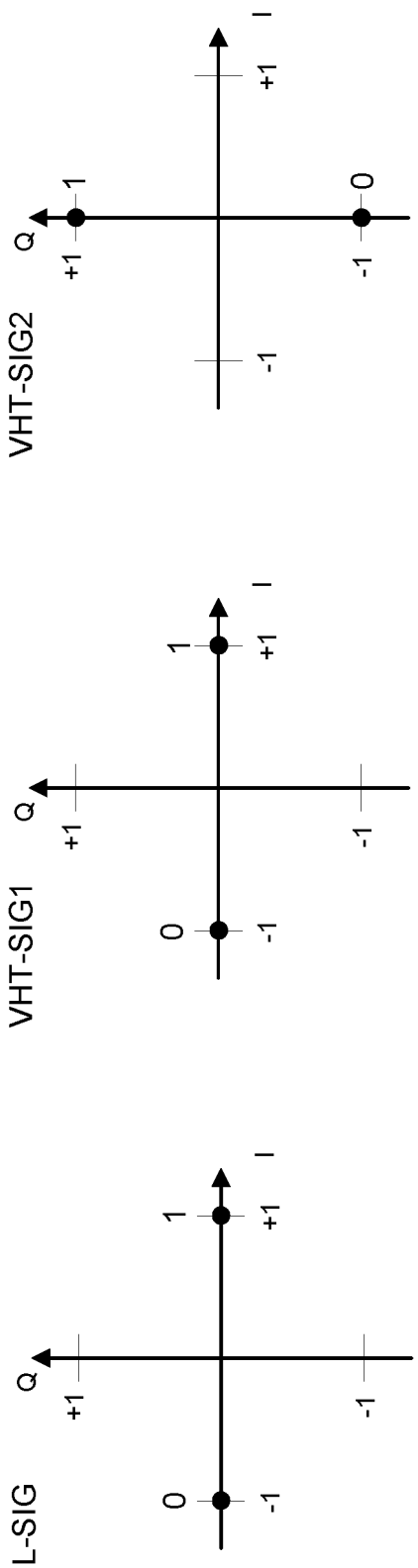
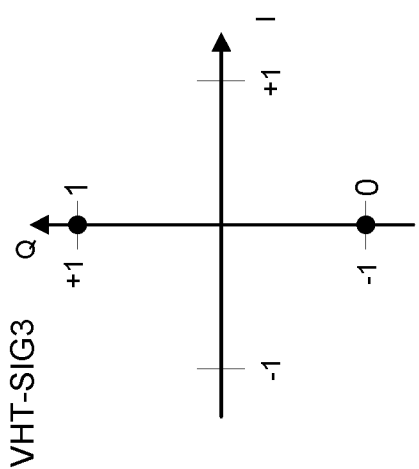
FIG. 7D
FIG. 7E

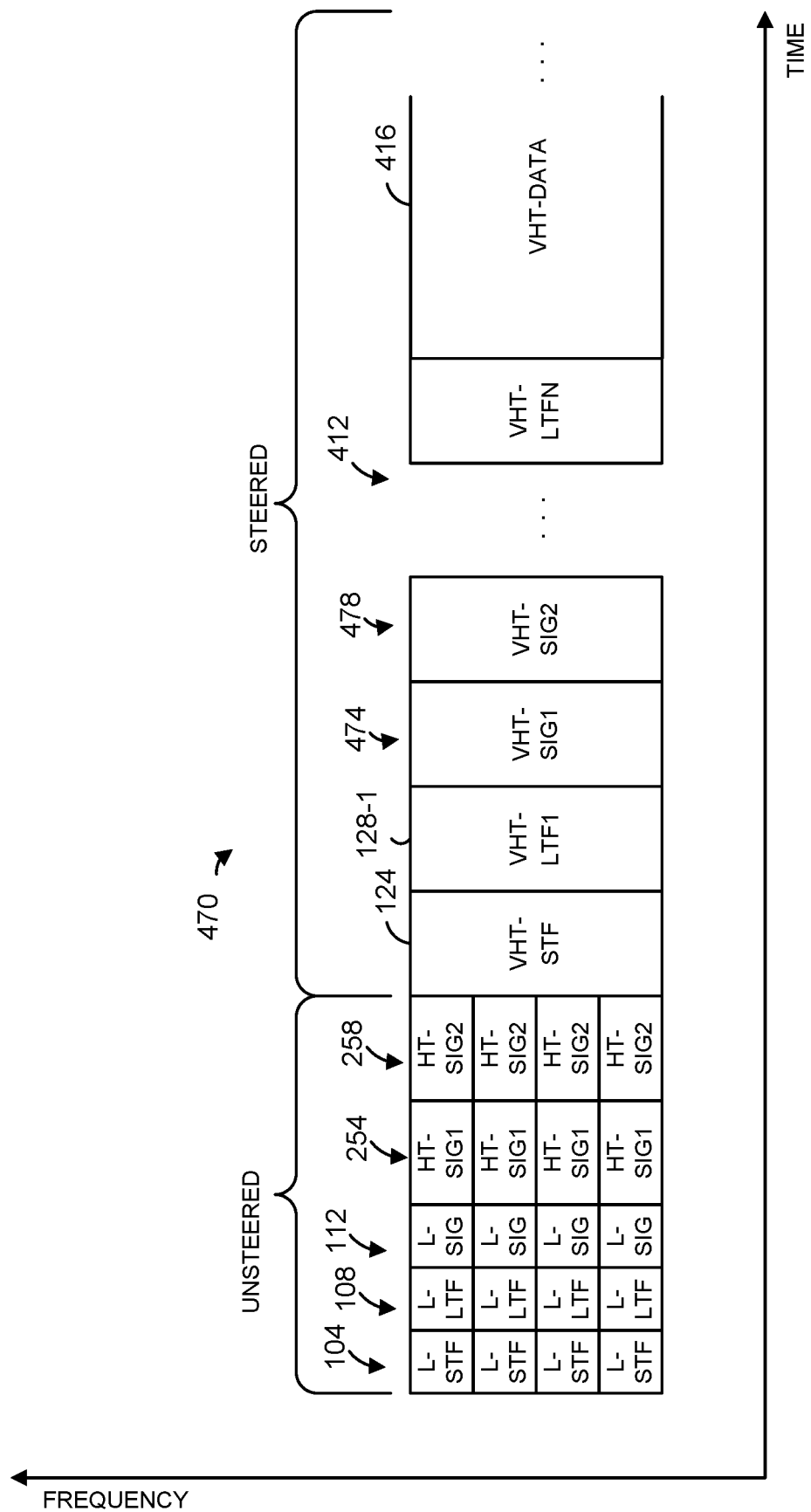

PHYSICAL LAYER FRAME FORMAT FOR WLAN

CROSS-REFERENCES TO RELATED APPLICATIONS

This application is a continuation of U.S. patent application Ser. No. 12/758,603, entitled "Physical Layer Frame Format for WLAN," filed on Apr. 12, 2010, which claims the benefit of the following U.S. Provisional patent applications:

U.S. Provisional Patent Application No. 61/168,732, entitled "80 MHz OFDM for WLAN," filed on Apr. 13, 2009;

U.S. Provisional Patent Application No. 61/181,518, entitled "80 MHz OFDM for WLAN," filed May 27, 2009;

U.S. Provisional Patent Application No. 61/227,360, entitled "80 MHz OFDM for WLAN," filed Jul. 21, 2009;

U.S. Provisional Patent Application No. 61/228,911, entitled "80 MHz OFDM for WLAN," filed Jul. 27, 2009;

U.S. Provisional Patent Application No. 61/229,900, entitled "80 MHz OFDM for WLAN," filed Jul. 30, 2009;

U.S. Provisional Patent Application No. 61/232,724, entitled "80 MHz OFDM for WLAN," filed Aug. 10, 2009;

U.S. Provisional Patent Application No. 61/233,440, entitled "80 MHz OFDM for WLAN," filed Aug. 12, 2009;

U.S. Provisional Patent Application No. 61/234,943, entitled "80 MHz OFDM for WLAN," filed Aug. 18, 2009;

U.S. Provisional Patent Application No. 61/240,604, entitled "80 MHz OFDM for WLAN," filed Sep. 8, 2009;

U.S. Provisional Patent Application No. 61/240,945, entitled "80 MHz OFDM for WLAN," filed Sep. 9, 2009;

U.S. Provisional Patent Application No. 61/241,760, entitled "80 MHz OFDM for WLAN," filed Sep. 11, 2009;

U.S. Provisional Patent Application No. 61/244,779, entitled "80 MHz OFDM for WLAN," filed Sep. 22, 2009;

U.S. Provisional Patent Application No. 61/252,290, entitled "80 MHz OFDM for WLAN," filed Oct. 16, 2009; and U.S. Provisional Patent Application No. 61/319,773, entitled "NDP Preamble," filed Mar. 31, 2010.

The disclosures of all of the above-referenced patent applications are hereby incorporated by reference herein in their entireties.

FIELD OF THE DISCLOSURE

The present disclosure relates generally to communication networks and, more particularly, to wireless local area networks that utilize orthogonal frequency division multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method is for generating and transmitting a physical layer (PHY) data unit for transmission via a communication channel, where the PHY data unit conforms to a first communication protocol. The method includes generating, at a communication device, the PHY data unit, including generating a preamble of the PHY data unit, wherein: the preamble includes a legacy field that is formatted according to a second communication protocol, the preamble includes a signal field having a first orthogonal frequency division multiplexing (OFDM) symbol and a second OFDM symbol, the first OFDM symbol (i) immediately follows the legacy field and (ii) is modulated using binary phase shift keying (BPSK) modulation, whereas a third communication protocol specifies that an OFDM symbol, defined by the third communication protocol, that immediately follows the legacy field is modulated using BPSK modulation rotated by 90 degrees (Q-BPSK), the second OFDM symbol (i) immediately follows the first OFDM symbol and (ii) is modulated using Q-BPSK to indicate to a receiver device that conforms to the first communication protocol that the data unit conforms to the first communication protocol, and the preamble is generated to include further fields that follow the signal field and that conform to the first communication protocol. The method also includes transmitting, with the communication device, the PHY data unit via the communication channel.

In another embodiment, an apparatus comprises a wireless local area network (WLAN) physical layer (PHY) unit, the WLAN PHY unit implemented on one or more integrated circuit devices configured to generate a PHY data unit, including generating a preamble of the PHY data unit, wherein: the preamble includes a legacy field that is formatted that is formatted according to a second communication protocol, the preamble includes a signal field having a first orthogonal frequency division multiplexing (OFDM) symbol and a second OFDM symbol, the first OFDM symbol (i) immediately follows the legacy field and (ii) is modulated using binary phase shift keying (BPSK) modulation, whereas a third communication protocol specifies that an OFDM symbol, defined by the third communication protocol, that immediately follows the legacy field is modulated using BPSK modulation rotated by 90 degrees (Q-BPSK), the second OFDM symbol (i) immediately follows the first OFDM symbol and (ii) is modulated using Q-BPSK to indicate to a receiver device that conforms to the first communication protocol that the data unit conforms to the first communication protocol, and the preamble is generated to include further fields that follow the signal field and that conform to the first communication protocol. The WLAN PHY unit includes one or more transceivers, implemented on the one or more integrated circuits, wherein the one or more transceivers are configured to transmit the generated data unit via a communication channel.

BRIEF DESCRIPTION OF THE DRAWINGS

FIGS. 2A and 2B are diagrams of a prior art data unit format;

FIG. 3 is a diagram of another prior art data unit format;

FIG. 4 is a diagram of another prior art data unit format;

FIG. 7D are diagrams of modulation used to modulate symbols in another example data unit, according to an embodiment;

FIG. 7E is a diagram of modulation used to modulate a symbol in another example data unit, according to an embodiment;

FIG. 20 is a diagram of another example data unit format, according to an embodiment;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. Similarly, different client stations in the vicinity of the AP may be configured to operate according to different communication protocols. When the AP transmits a data unit according to a first protocol, a preamble of the data is formatted such that a client station that operates according to a second protocol, and not the first protocol, is able to determine certain information regarding the data unit, such as a duration of the data unit, and/or that the data unit does not conform to the second protocol. Additionally, a preamble of the data unit is formatted such that a client station that operates according to the first protocol is able to determine the data unit conforms to the first protocol. Similarly, a client station configured to operate according to the first protocol also transmits data units such as described above.

Data units formatted such as described above may be useful, for example, with an AP that is configured to operate with client stations according to a plurality of different communication protocols and/or with WLANs in which a plurality of client stations operate according to a plurality of different communication protocols. Continuing with the example above, a communication device configured to operate according to both the first communication protocol and the second communication protocol is able to determine that the data unit is formatted according to the first communication protocol and not the second communication protocol. Similarly, a communication device configured to operate according to the second communication protocol but not the first communication protocol is able to determine that the data unit is not formatted according to the second communication protocol and/or determine a duration of the data unit.

Figure 1:
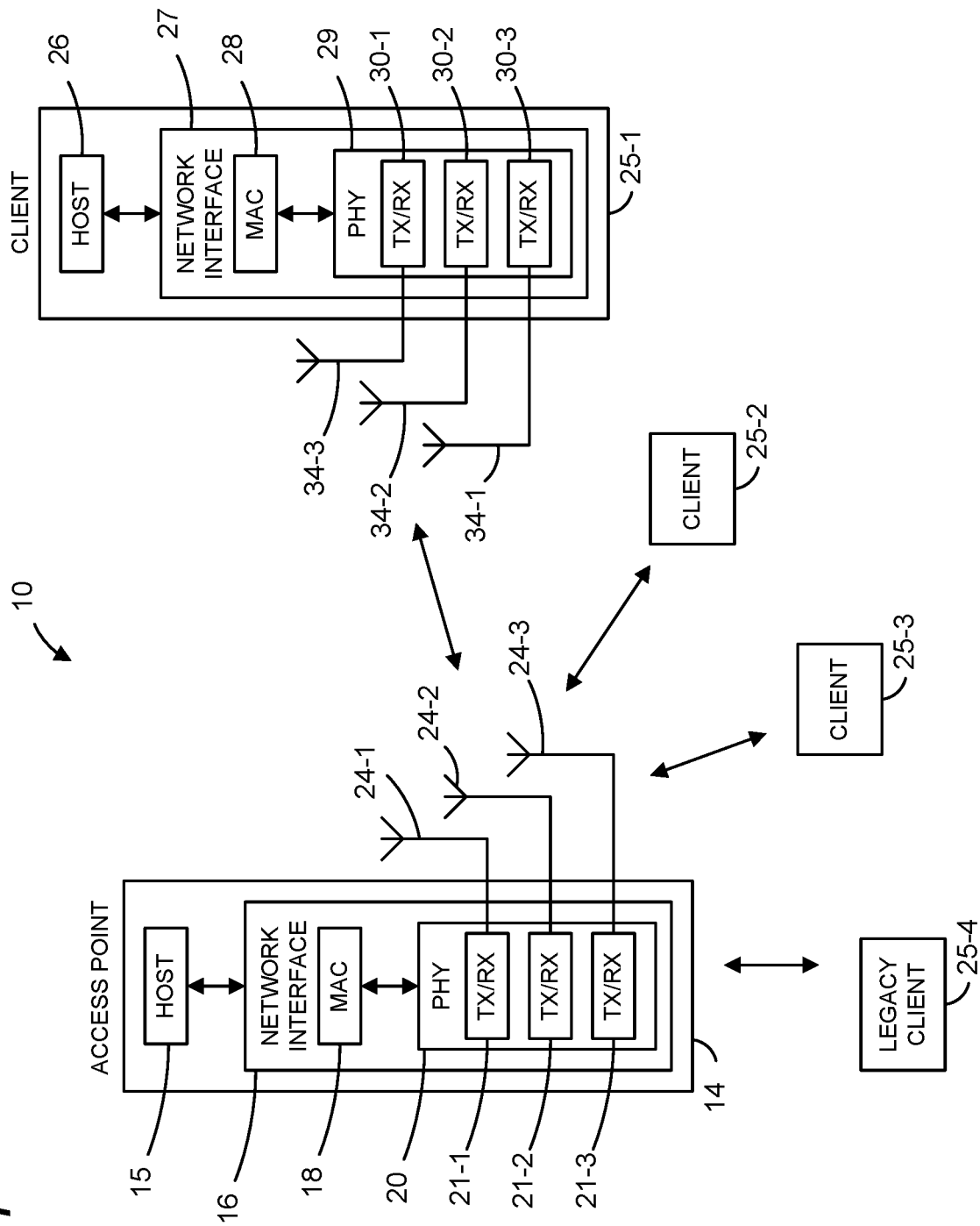
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC unit 18 and the PHY unit 20 are configured to operate according to a first communication protocol (e.g., the IEEE 802.11ac Standard, now in the process of being standardized). In another embodiment, the MAC unit 18 and the PHY unit 20 are also configured to operate according to a second communication protocol (e.g., the IEEE 802.11n Standard). In yet another embodiment, the MAC unit 18 and the PHY unit 20 are additionally configured to operate according to the second communication protocol and a third communication protocol (e.g., the IEEE 802.11a Standard).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol or the third communication protocol (referred to herein as a "legacy client station").

The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4, has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol and/or the third communication protocol.

In various embodiments, the PHY unit 20 of the AP 14 is configured to generate data units conforming to the first communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY unit 20 of the AP 14 is configured to process received data units conforming to the first communication protocol and having formats described hereinafter and to determine that such data units conform to the first communication protocol, according to various embodiments.

In various embodiments, the PHY unit 29 of the client device 25-1 is configured to generate data units conforming to the first communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY unit 29 of the client device 25-1 is configured to process received data units conforming to the first communication protocol and having formats described hereinafter and to determine that such data units conform to the first communication protocol, according to various embodiments.

FIG. 2A is a diagram of a prior art data unit 60 that the legacy client station 25-4 is configured to transmit to the AP 14 via orthogonal frequency domain multiplexing (OFDM) modulation, according to an embodiment. The data unit 60 conforms to the IEEE 802.11a Standard and occupies a 20 Megahertz (MHz) band. The data unit 60 includes a preamble having a legacy short training field (L-STF) 62, a legacy long training field (L-LTF) 64, and a legacy signal field (L-SIG) 66. The data unit 60 also includes a data portion 68. FIG. 2B is a diagram of an example data portion 68 (not low density parity check encoded), which includes a service field, a scrambled physical layer service data unit (PSDU), tail bits, and padding bits, if needed.

FIG. 3 is a diagram of a prior art OFDM data unit 78 that the legacy client station 25-4 is configured to transmit to the AP 14, according to an embodiment. The data unit 78 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 78 includes a preamble having an L-STF 80, an L-LTF 81, an L-SIG 82, a high throughput signal field (HT-SIG) 83, a high throughput short training field (HT-STF) 84, N data high throughput long training fields (HT-LTFs) 85, where N is an integer, and M extension HT-LTFs 86, where M is an integer. The data unit 78 also includes a data portion 87.

FIG. 4 is a diagram of a prior art OFDM data unit 90 that the legacy client station 25-4 is configured to transmit to the AP 14, according to an embodiment. The data unit 90 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 90 includes a preamble having a high throughput Greenfield short training field (HT-GF-STF) 91, a first high throughput long training field (HT-LTF1) 92, a HT-SIG 93, N data HT-LTFs 94, where N is an integer, and M extension HT-LTFs 95, where M is an integer. The data unit 90 also includes a data portion 98.

Figure 5:
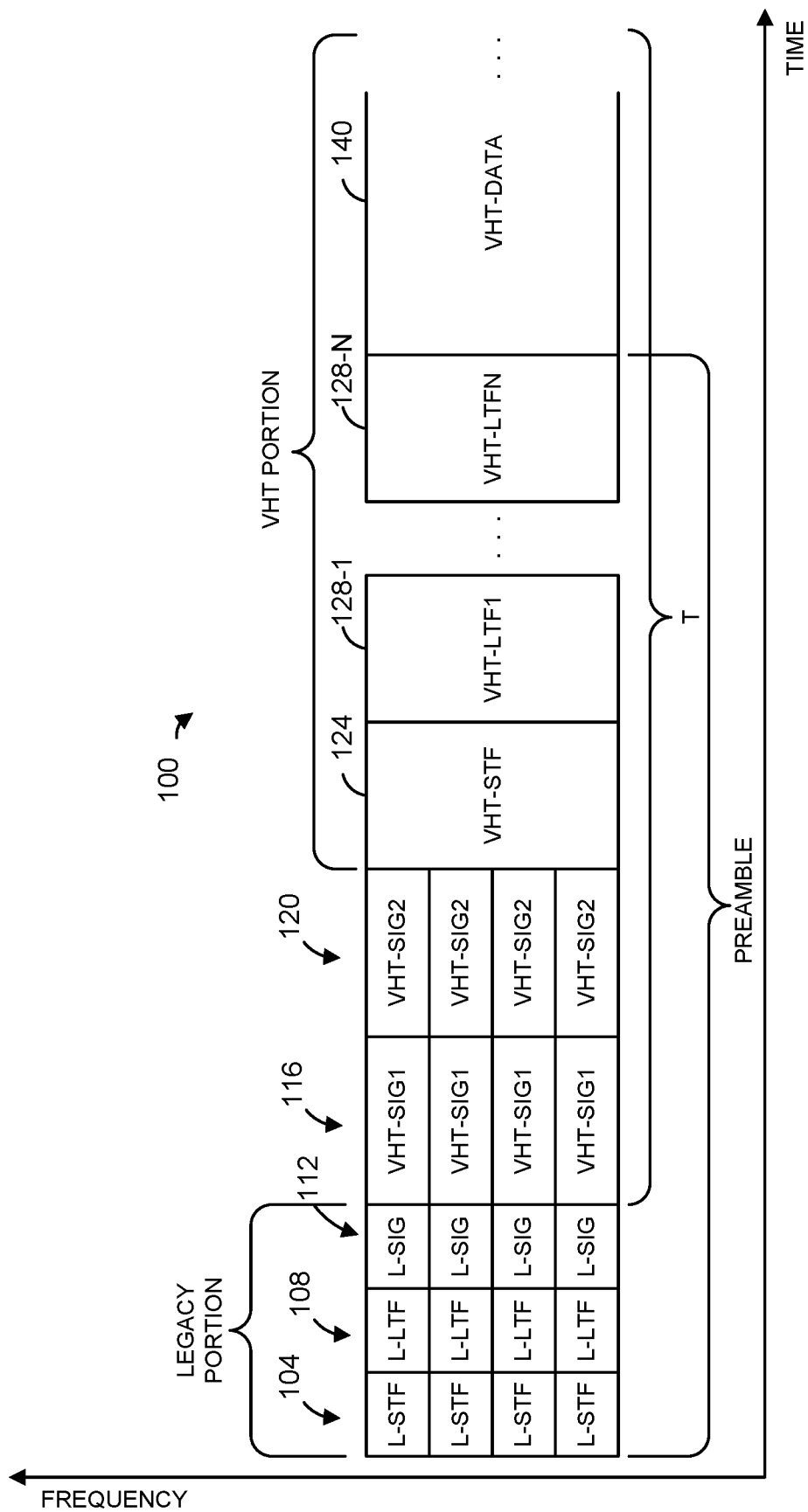
FIG. 5 is a diagram of an example data unit format, according to an embodiment.

FIG. 5 is a diagram of an OFDM data unit 100 that the AP 14 is configured to transmit to the client station 25-1, according to an embodiment. In an embodiment, the client station 25-1 is also configured to transmit the data unit 100 to the AP 14. The data unit 100 conforms to the first communication protocol and occupies an 80 MHz band. In other embodiments, data units similar to the data unit 100 occupy different bandwidths such as 20 MHz, 40 MHz, 120 MHz, 160 MHz, or any suitable bandwidth. Additionally, the 80 MHz band need not be contiguous, but may include two or more smaller bands, such as two 40 MHz bands, separated in frequency. The data unit 100 is suitable for "mixed mode" situations, i.e., when the WLAN 10 includes a client station (i.e., the legacy client station 25-4) that conforms to the IEEE 802.11a Standard and/or the IEEE 802.11n Standard, but not the first communication protocol. The data unit 100 can be utilized in other situations as well. The data unit 100 includes a preamble having four L-STFs 104, four L-LTFs 108, four L-SIGs 112, four first very high throughput signal fields (VHT-SIG1) 116, four second very high throughput signal fields (VHT-SIG2) 120, a very high throughput short training field (VHT-STF) 124, and N very high throughput long training fields (VHT-LTFs) 128, where N is an integer. The data unit 100 also includes a data portion 140. The L-STFs 104, the L-LTFs 108, and the L-SIGs 112 form a legacy portion. The VHT-STF 124, the VHT-LTFs 128, and the data portion 140 form a very high throughput (VHT) portion.

In the embodiment of FIG. 5, each of the L-STFs 104, each of the L-LTFs 108, each of the L-SIGs 112, each of the VHT-SIG1s, and each of the VHT-SIG2s occupy a 20 MHz band. In the present disclosure, several example data units, including the data unit 100, having an 80 MHz contiguous bandwidth are described for the purposes of illustrating embodiments of frame formats, but these frame format embodiments and other embodiments are applicable to other suitable bandwidths (including noncontiguous bandwidths). For instance, although the preamble of FIG. 5 includes four of each of the L-STFs 104, the L-LTFs 108, the L-SIGs 112, the VHT-SIG1s, and the VHT-SIG2s, in other embodiments in which the OFDM data unit occupies a cumulative bandwidth other than 80 MHz, such as 20 MHz, 40 MHz, 120 MHz, 160 MHz, etc., a different suitable number of the L-STFs 104, the L-LTFs 108, the L-SIGs 112, the VHT-SIG1s, and the VHT-SIG2s is utilized accordingly (e.g., one of each of the L-STFs 104, the L-LTFs 108, the L-SIGs 112, the VHT-SIG1s, and the VHT-SIG2s for an OFDM data unit occupying 20 MHz, two of each of the fields for a 40 MHz bandwidth OFDM data unit, six of each of the fields for a 120 MHz bandwidth OFDM data unit, and eight of each of the fields for a 160 MHz bandwidth OFDM data unit). Also in 80 MHz and 160 MHz bandwidth OFDM data units, for example, the band is not contiguous in frequency, in some embodiments and situations. Thus, for example, the L-STFs 104, the L-LTFs 108, the L-SIGs 112, the VHT-SIG1s, and the VHT-SIG2s occupy two or more bands that are separated from each other in frequency, and adjacent bands are separated in frequency by at least one MHz, at least five MHz, at least 10 MHz, at least 20 MHz, for example, in some embodiments. In the embodiment of FIG. 5, each of the STF 124, the VHT-LTFs 128, and the data portion 140 occupy an 80 MHz band. If the data unit conforming to the first communication protocol is an OFDM data unit that occupies a cumulative bandwidth such as 20 MHz, 40 MHz, 120 MHz, or 160 MHz OFDM, the VHT-STF, VHT-LTFs and VHT data portion occupy the corresponding whole bandwidth of the data unit, according to an embodiment.

In an embodiment, each of the L-STFs 104 and each of the L-LTFs 108 have a format as specified in the IEEE 802.11a Standard and/or the IEEE 802.11n Standard. In an embodiment, each of the L-SIGs 112 has a format at least substantially as specified in the IEEE 802.11a Standard and/or the IEEE 802.11n Standard. The length and rate subfields in the L-SIGs 112 are set to indicate the duration T corresponding to remainder of the data unit 100 after the legacy portion. This permits client devices that are not configured according to the first communication protocol to determine an end of the data unit 100, for carrier sense multiple access/collision avoidance (CSMA/CA) purposes, for example. For instance, a legacy client device configured according to the IEEE 802.11a Standard will detect a data error from VHT-SIG1 field, according to the receiver state machine specified in the IEEE 802.11a Standard. Further according to the IEEE 802.11a Standard, the legacy client device will wait until the end of a computed packet duration (T) before performing clear channel assessment (CCA).

The frequency domain symbols of the legacy portion are repeated over four 20 MHz sub-bands of the 80 MHz band. Legacy client devices that are configured according to the IEEE 802.11a Standard and/or the IEEE 802.11n Standard with 20 MHz bandwidth will recognize a legacy IEEE 802.11a Standard preamble in any of the 20 MHz sub-bands. In some embodiments, the modulation of different 20 MHz sub-bands signals is rotated by different angles. For example, in one embodiment, a first subband is rotated 0-degrees, a second subband is rotated 90-degrees, a third sub-band is rotated 180-degrees, and a fourth sub-band is rotated 270-degrees. In other embodiments, different suitable rotations are utilized. As just one example, a first sub-band is rotated 45-degrees, a second sub-band is rotated 90-degrees, a third sub-band is rotated −45-degrees, and a fourth sub-band is rotated −90-degrees.

In one embodiment, each of the L-SIGs 112 has a format at least substantially as specified in the IEEE 802.11a Standard and/or the IEEE 802.11n Standard except that the "reserved" bit is set to 1, whereas the IEEE 802.11a Standard and the IEEE 802.11n Standard specify that the "reserved" bit is set to 0. By setting the "reserved" bit to 1, this signals devices that conform to the first communication protocol that the data unit 100 conforms to the first communication protocol, for example. In other embodiments, the "reserved" bit to 0.

In one embodiment, each of the VHT-SIG1s, and each of the VHT-SIG2s has a format at least substantially the same as the HT-SIG1 and the HT-SIG2 fields specified in the IEEE 802.11n Standard. For example, a modulation and coding scheme (MCS) field in VHT-SIG1 and/or VHT-SIG2 is the same as the MCS field in HT-SIG, but applied to an 80 MHz band. In one embodiment, MCS 32 is disallowed for VHT data units such as the data unit 100. In other embodiments, MCS 32 is allowed for VHT data units such as the data unit 100.

In some embodiments, the format and/or modulation of VHT-SIG1 and/or VHT-SIG2 is at least different to cause a legacy device operating according to the IEEE 802.11n Standard to detect an error, such as a cyclic redundancy check (CRC) error. Further according to the IEEE 802.11n Standard, the legacy client device will wait until the energy of the data unit 100 drops out before switching to CCA idle mode.

In some embodiments, the modulation of the VHT-SIG1s and/or the VHT-SIG2s in the different 20 MHz sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. As just one example, a first sub-band is rotated 45-degrees, a second sub-band is rotated 90-degrees, a third sub-band is rotated −45-degrees, and a fourth sub-band is rotated −90-degrees. In an embodiment, the same rotation utilized in the legacy portion (if any) is utilized for the VHT-SIG1s and the VHT-SIG2s.

In one embodiment, the "reserved" bit (as specified for HT-SIG in the IEEE 802.11n Standard) in VHT-SIG2 is set to 0, whereas the IEEE 802.11n Standard defines the reserved bit in HT-SIG is set to 1), to signal to a device configured according to the first communication protocol that the data unit 100 conforms to the first communication protocol. In other embodiments, the "reserved" bit (as specified for HT-SIG in the IEEE 802.11n Standard) in VHT-SIG2 is set to 1.

In some embodiments, each of the VHT-SIG1s and each of the VHT-SIG2s have a format not substantially the same as the HT-SIG1 and the HT-SIG2 fields specified in the IEEE 802.11n Standard. For example, the subfield in HT-SIG "BW20/40" as defined in the IEEE 802.11n Standard is omitted, or is combined with the reserved bit to select 20, 40, or 80 MHz bandwidth, according to an embodiment. As another example, the subfield "aggregated" as defined in the IEEE 802.11n Standard is omitted. In an embodiment, differences in the formats of the VHT-SIG fields and the HT-SIG fields defined in the IEEE 802.11n Standard will cause a legacy device configured according to the IEEE 802.11n Standard to detect an error, such as a CRC error, upon receiving a VHT-SIG field.

Figure 6:
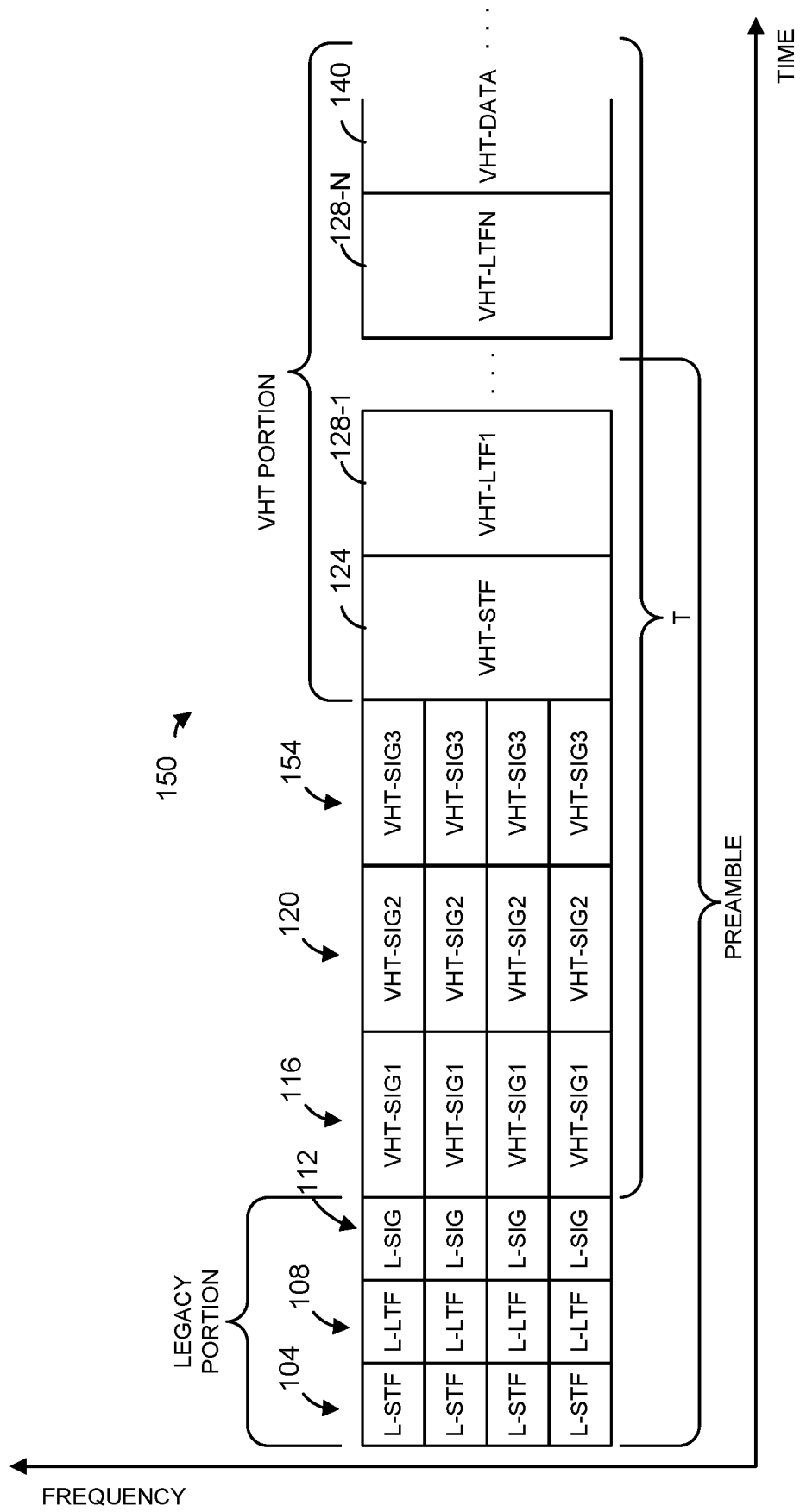
FIG. 6 is a diagram of another example data unit format, according to an embodiment.

FIG. 6 a diagram of an OFDM data unit 150 that the AP 14 is configured to transmit to the client station 25-1, according to an embodiment. In an embodiment, the client station 25-1 is also configured to transmit the data unit 150 to the AP 14. The data unit 150 is the same as the data unit 100 of FIG. 5, except that the data unit 150 includes third very high throughput signal fields (VHT-SIG3s) 154 to convey physical layer (PHY) information. In the embodiment of FIG. 6, a CRC may cover each VHT-SIG1, VHT-SIG3, VHT-SIG3 tuple. In an embodiment, the CRC that covers the VHT-SIG1, VHT-SIG3, VHT-SIG3 tuple is the same as defined for HT-SIG in the IEEE 802.11n Standard.

In an embodiment, the 3 VHT-SIG subfield formats are substantially different from HT-SIG fields in the IEEE 802.11n Standard (e.g. use 2 bits to signal 20/40/80 MHz bandwidth, or no indication of 20/40/80 MHz in an implementation that only 80 MHz is allowed for VHT packets). In an embodiment, the same CRC check as in HT-SIG specified by the IEEE 802.11n Standard is moved to VHT-SIG3, and the CRC checks the correctness of the data in all the 3 VHT-SIG fields.

Figure 7A:
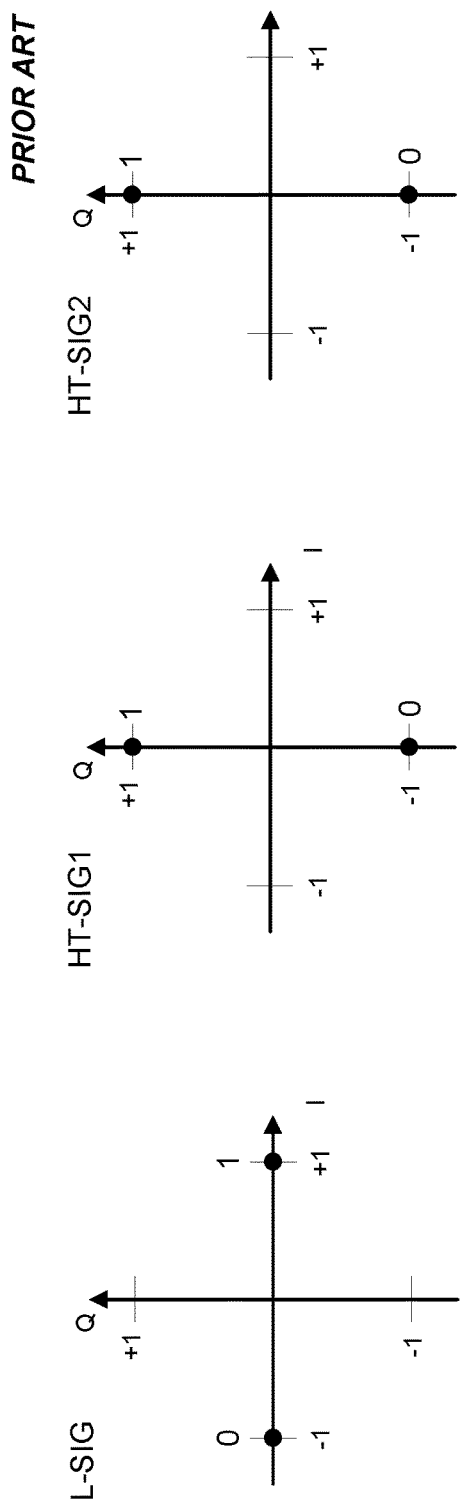
FIG. 7A are diagrams of modulation used to modulate symbols in a prior art data unit.

FIG. 7A is a set of diagrams illustrating modulation of the L-SIG, HT-SIG1, and HT-SIG2 fields as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field.

Figure 7B:
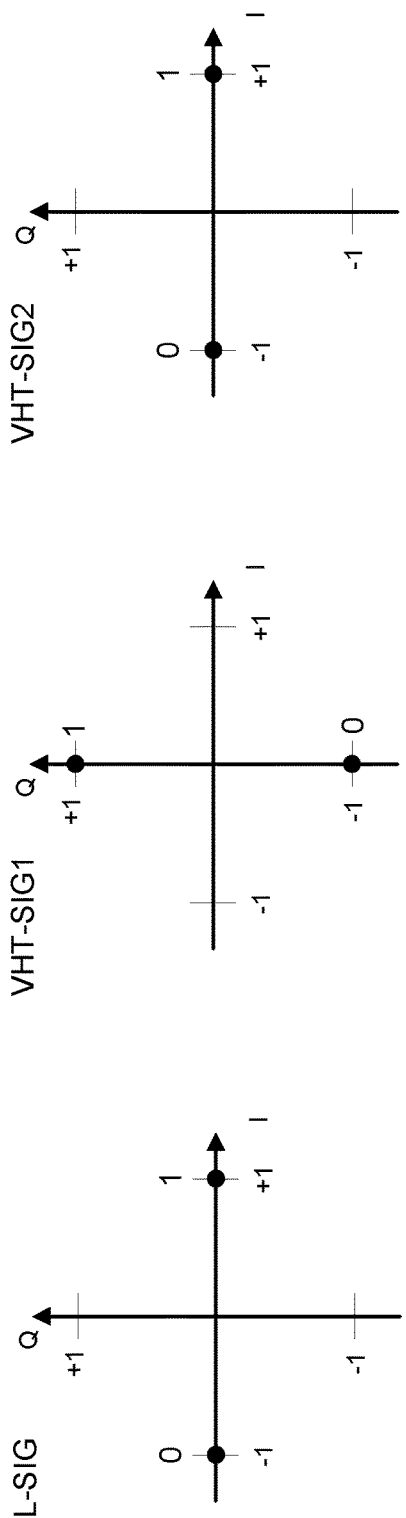
FIG. 7B are diagrams of modulation used to modulate symbols in an example data unit, according to an embodiment.

FIG. 7B is a set of diagrams illustrating modulation of the L-SIG, VHT-SIG1, and VHT-SIG2 fields of the data unit 100 of FIG. 5, according to an embodiment. Similar to the HT-SIG1 field in FIG. 7A, the VHT-SIG1 field is rotated by 90 degrees as compared to the modulation of the L-SIG field. On the other hand, unlike the HT-SIG2 field of FIG. 7A, the VHT-SIG2 field is the same as the modulation of the L-SIG field. In an embodiment, the different modulation of the VHT-SIG2 field and the HT-SIG2 field defined in the IEEE 802.11n Standard will cause a legacy device configured according to the IEEE 802.11n Standard to detect an error, such as a CRC error, upon receiving a VHT-SIG2 field. Additionally, the different modulation of the VHT-SIG2 field and the HT-SIG2 field defined in the IEEE 802.11n Standard will permit a device configured according to the first communication protocol to determine that the data unit 100 conforms to the first communication protocol.

In other embodiments, the VHT-SIG2 field is rotated by 90 degrees as compared to the modulation of the L-SIG field, similar to the HT-SIG2 field of FIG. 7A.

Figure 7C:
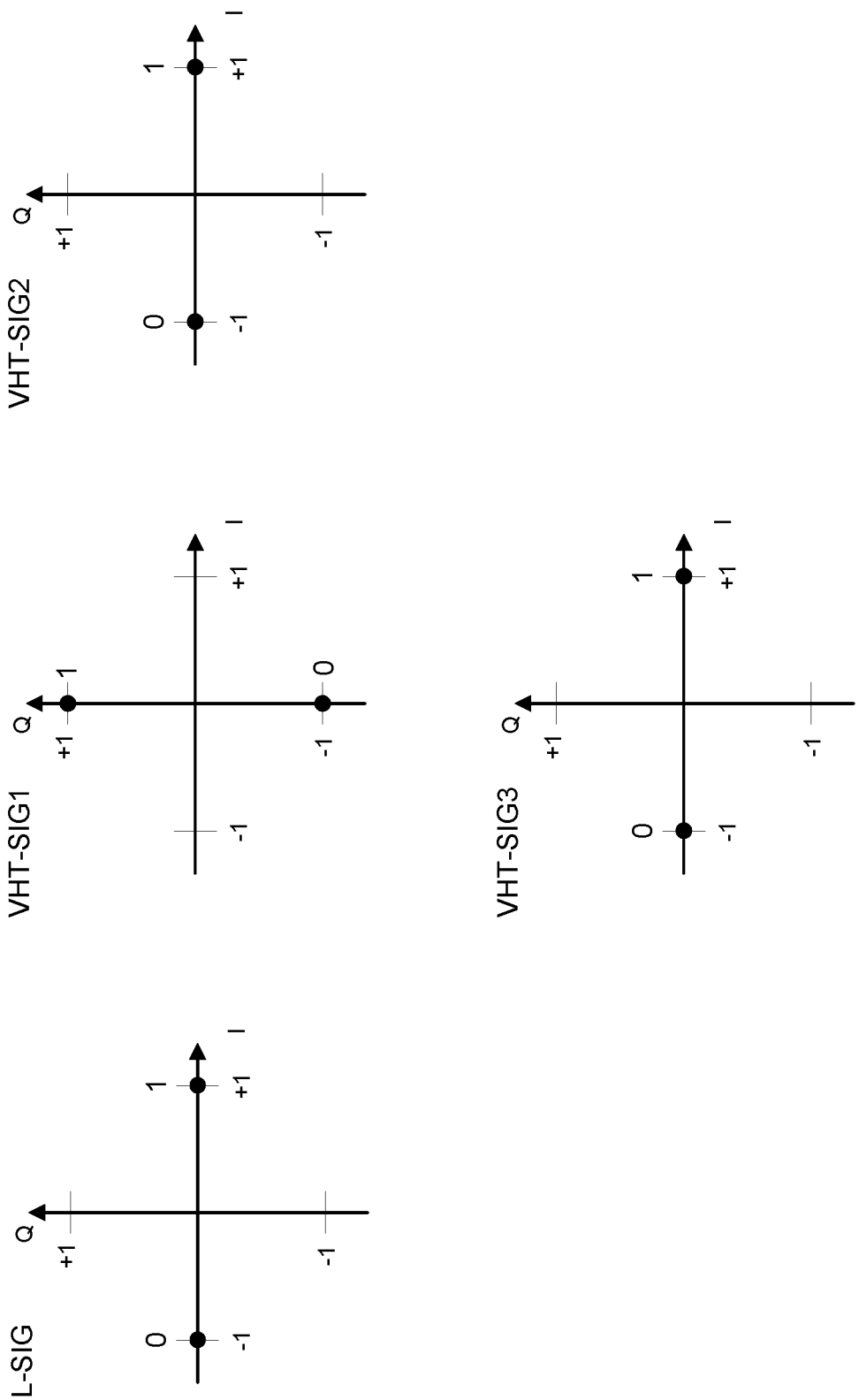
FIG. 7C are diagrams of modulation used to modulate symbols in another example data unit, according to an embodiment.

FIG. 7C is a set of diagrams illustrating modulation of the L-SIG, VHT-SIG1, VHT-SIG2, and VHT-SIG3 fields of the data unit 150 of FIG. 6, according to an embodiment. Similar to the HT-SIG1 field in FIG. 7A, the VHT-SIG1 field is rotated by 90 degrees as compared to the modulation of the L-SIG field. On the other hand, unlike the HT-SIG2 field of FIG. 7A, the VHT-SIG2 field is the same as the modulation of the L-SIG field. Additionally, the VHT-SIG3 field is the same as the modulation of the L-SIG field. In an embodiment, the different modulation of the VHT-SIG2 field and the HT-SIG2 field defined in the IEEE 802.11n Standard will cause a legacy device configured according to the IEEE 802.11n Standard to detect an error, such as a CRC error, upon receiving a VHT-SIG2 field. Additionally, the different modulation of the VHT-SIG2 field and the HT-SIG2 field defined in the IEEE 802.11n Standard will permit a device configured according to the first communication protocol to determine that the data unit 150 conforms to the first communication protocol.

In other embodiments, the VHT-SIG2 field is rotated by 90 degrees as compared to the modulation of the L-SIG field, similar to the HT-SIG2 field of FIG. 7A. In other embodiments, the VHT-SIG3 field is rotated by 90 degrees as compared to the modulation of the L-SIG field.

Referring to FIGS. 5 and 6, each VHT-SIG is modulated by one OFDM symbol, according to an embodiment.

If the VHT-SIG fields in the data units as described in FIGS. 5 and 6, utilizes the modulations as described in FIGS. 7B and 7C, in these embodiments, a device that conforms to the IEEE 802.11a Standard will set CCA idle duration according to the L-SIG field. A device that conforms to the IEEE 802.11n Standard (also compatible with the IEEE 802.11a Standard) will assume, at least in some circumstances, that the data unit is a data unit that conforms to the IEEE 802.11n standard (since VHT-SIG1 is modulated the same way as HT-SIG1), but may fail decoding the assumed two "HT-SIG" fields since the VHT-SIG2 is modulated different from HT-SIG2. In this case, the IEEE 802.11n conforming device may set CCA idle duration according to the L-SIG field, or set CCA idle duration according to the energy of the data unit (i.e. reset CCA when the over-the-air energy of the data unit drops down to a certain level—meaning the data unit ends). Devices that conform to the first communication protocol will determine that the data unit conforms to the first communication protocol by one or more of detecting the "reserved bit" in the L-SIG field, detecting the "reserved bit" in the VHT-SIG field, detecting modulation of the VHT-SIG fields, etc., depending on the particular embodiment.

In some embodiment, the VHT-SIG fields are modulated differently than as shown in FIGS. 7B and 7C. In the above mentioned VHT signaling approaches that change the constellation points of the VHT_SIG fields located immediately after the L-SIG field (i.e. FIGS. 5 and 6) to signal that the data unit conforms to the first communication protocol, generally any suitable change to the VHT-SIG fields modulation that is different from modulation from the HT-SIG fields in the IEEE 802.11n Standard, or any changes on L-SIG modulation that is different from L-SIG in the IEEE 802.11n and the IEEE 802.11n Standards can be utilized. Different from FIG. 7B or 7C, in an embodiment, any suitable modulation in VHT-SIG1 is utilized so that a device that conforms to the IEEE 802.11n Standard will assume the data unit is not an HT data unit (e.g., the average Q energy of the constellation is not significantly larger than I energy as defined in the IEEE 802.11n Standard for the HT-SIG field) but rather assumes that data unit is an IEEE 802.11a data unit, and thus treats the data unit as an IEEE 802.11a data unit. In this case, although the IEEE 802.11n conforming device may not decode the data unit correctly, it will set CCA idle duration correctly according to the L-SIG field. Further, a device that conforms to the first communication protocol can determine that the data unit conforms to the first communication protocol by one or more of detecting the "reserved bit" in the L-SIG field, detecting the "reserved bit" in the VHT-SIG field, detecting modulation of the VHT-SIG fields, etc., depending on the particular embodiment.

For example, in one embodiment, all of the VHT-SIG symbols are modulated using BPSK. As another example, the first VHT-SIG symbol is BPSK, and the remaining symbols are modulated using Q-BPSK. FIG. 7D is a set of diagrams illustrating modulation of the L-SIG, VHT-SIG1, and VHT-SIG2 fields of the data unit 100 of FIG. 5, according to an embodiment. Unlike the HT-SIG1 field in FIG. 7A, the VHT-SIG1 field is not rotated by 90 degrees as compared to the modulation of the L-SIG field (i.e., the VHT-SIG1 field is BPSK modulated). On the other hand, like the HT-SIG2 field of FIG. 7A, the VHT-SIG2 field is rotated by 90 degrees as compared to the modulation of the L-SIG field. In the embodiment of FIG. 7D, devices conforming to the IEEE 802.11n Standard will treat the data unit as an IEEE 802.11a data unit, because the modulation of the VHT-SIG1 field is not BPSK, as specified by the IEEE 802.11n standard. In this embodiment, the device conforming to the IEEE 802.11n Standard will set the CCA idle duration according to L-SIG. The modulation of FIG. 7D can also be used with the data unit 150 of FIG. 6, and FIG. 7E is a diagram of modulation for the VHT-SIG3 field of FIG. 6, according to an embodiment. In another embodiment, all or the first or some of the VHT-SIG symbols are modulated with neither BPSK, nor Q-BPSK. For example, VHT-SIG1 or VHT-SIG2 or all the VHT-SIGs are modulated with 45-deg rotated BPSK. As another example, VHT-SIG1 or VHT-SIG2 or all the VHT-SIGs are modulated with R*45-deg rotated BPSK, wherein R=1, 2, or 3. As another example, VHT-SIG1 or VHT-SIG2 or all the VHT-SIGs are modulated with BPSK and Q-BPSK alternatively or not alternatively but in a predetermined manner (e.g. any N tones using Q-BPSK, the other 52-N tones using BPSK) across the data and pilot tones (52 tones in each 20 MHz sub-band) i.e., a predetermined mapping of the tones for BPSK and Q-BPSK modulations.

The VHT-STF, VHT-LTFs, and VHT-Data OFDM symbols are defined similar to HT-STF, HT-LTFs and HT-Data as in the IEEE 802.11n Standard, except that each OFDM symbol is defined over 80 MHz bandwidth, according to an embodiment. In other embodiments, each OFDM symbol is defined over other suitable bandwidths, such as 20 MHz, 40 MHz, 160 MHz, etc. In the case of an 80 MHz OFDM symbol, a 256 point inverse fast Fourier transform (IFFT) and a 256 point fast Fourier transform (FFT) is utilized for 80 MHz bandwidth transmissions. In an embodiment, the OFDM duration is 3.6 microseconds (μs) for a short guard interval (GI) and 4 μs for a long GI.

If the constraint on the maximum number of space-time streams is the same as in the IEEE 802.11n Standard, then the spatial mapping P matrix in VHT-STFs, and VHT-LTFs, signal shaping such as frequency cyclic shift diversity (CSD), etc., are substantially the same as the IEEE 802.11n Standard, (e.g., extended to an 80 MHz band), according to an embodiment.

For an 80 MHz OFDM signal, the symbols in the tones of VHT-STF and VHT-LTFs, the assignment of data tone numbers/positions, guard tones around edge bands and direct current (DC) tones, number/position/content of pilot tones, and the frequency interleaver, are configured differently from 20 MHz bandwidth and 40 MHz bandwidth legacy signals in the IEEE 802.11a Standard and the IEEE 802.11n Standard.

Pilots will not be present for VHT-STF and VHT-LTFs as in the IEEE 802.11a Standard and the IEEE 802.11n Standard, according to an embodiment.

Figure 8:
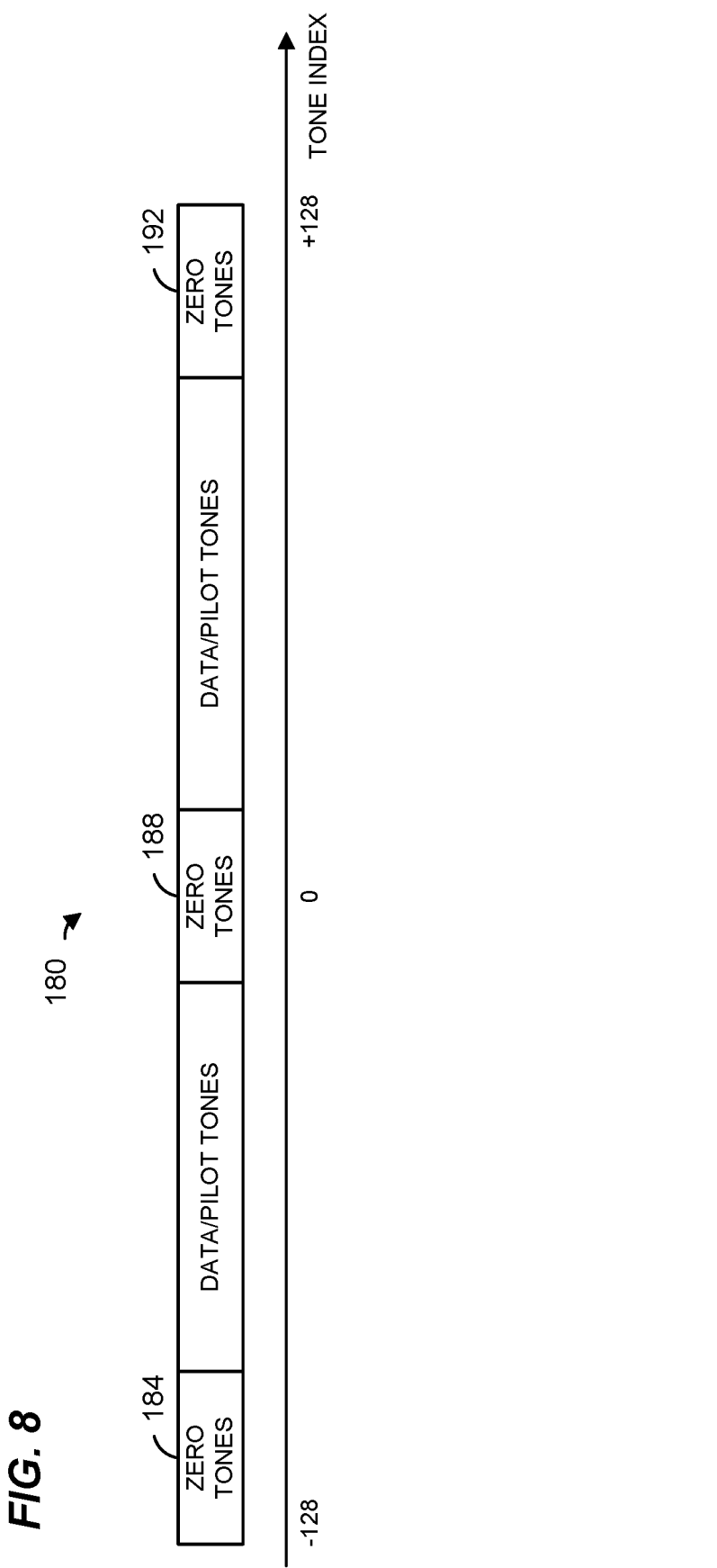
FIG. 8 is a diagram of tones in an orthogonal frequency division multiplexing (OFDM) symbol, according to an embodiment.

FIG. 8 is a diagram illustrating an example OFDM tone structure for an 80 MHz OFDM symbol for the VHT-data portions of FIGS. 5 and 6, according to an embodiment. An OFDM symbol 180 includes a group 184 of zero tones at a lower frequency end, a group 188 of zero tones at a center section, and a group 192 of zero tones at an upper frequency end. Data and pilot tones are located between the groups of zero tones.

Figure 9:
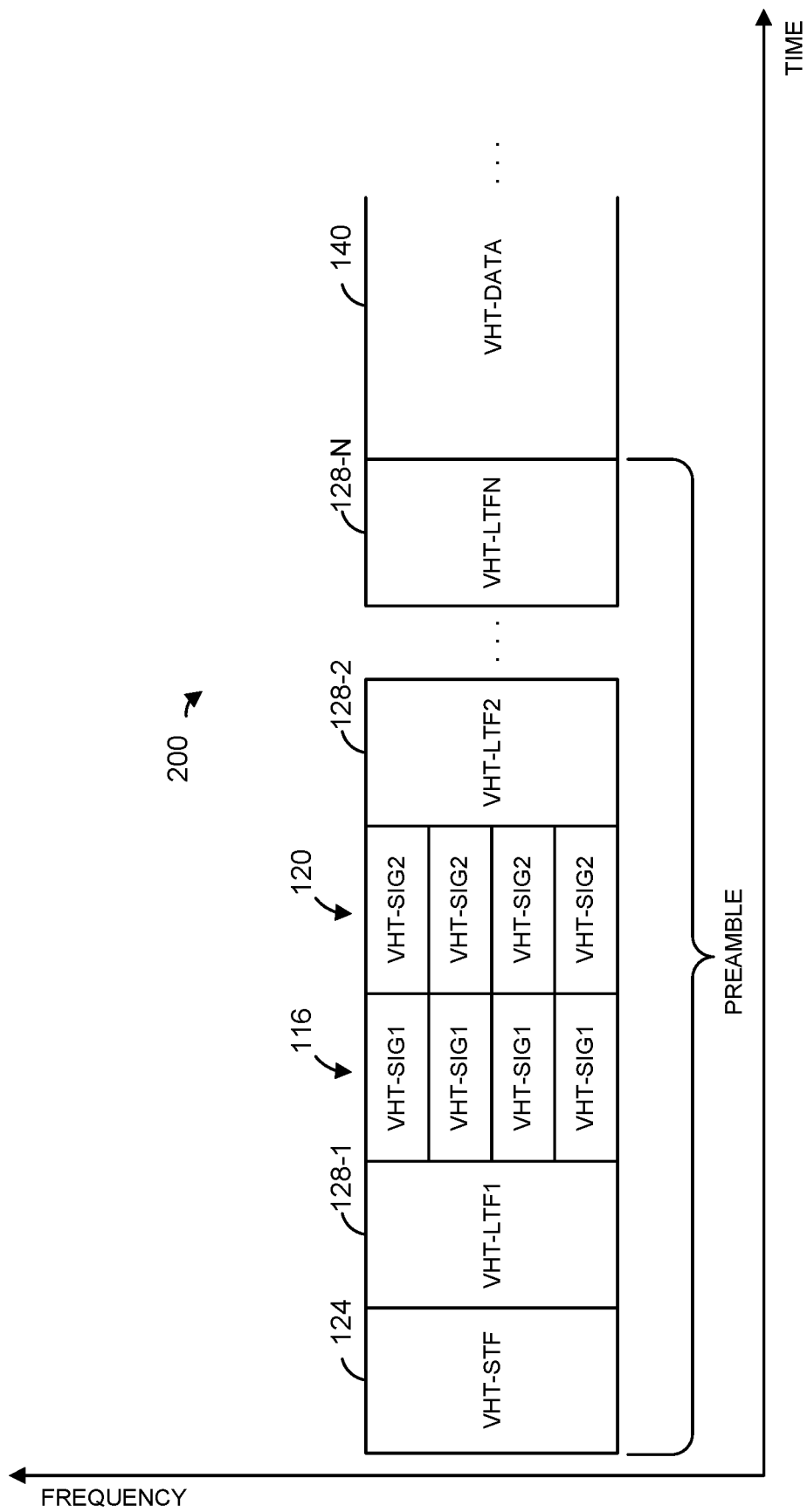
FIG. 9 is a diagram of another example data unit format, according to an embodiment.

FIG. 9 is a diagram of an OFDM data unit 200 that the AP 14 is configured to transmit to the client station 25-1, according to an embodiment. In an embodiment, the client station 25-1 is also configured to transmit the data unit 200 to the AP 14. The data unit 200 conforms to the first communication protocol and occupies an 80 MHz band. In other embodiments, data units similar to the data unit 200 occupy different bandwidths such as 20 MHz, 40 MHz, 120 MHz, 160 MHz, or any suitable bandwidth. Additionally, the band in which the OFDM data unit is transmitted need not be contiguous, but may include two or more smaller bands separated in frequency. In an embodiment in which the OFDM data unit 200 has an 80 MHz bandwidth, for example, the OFDM data unit 200 may occupy two separate 40 MHz bands, separated in frequency. The data unit 200 is suitable for "Greenfield" situations, i.e., when the WLAN 10 does not include any client stations (i.e., the legacy client station 25-4) that conforms to the IEEE 802.11a Standard and/or the IEEE 802.11n Standard, but not the first communication protocol. The data unit 200 can be utilized in other situations as well. For example, is some embodiments, the data unit 200 can be utilized i.e., when the WLAN 10 does not include any client stations that conforms to the IEEE 802.11a Standard but not the first communication protocol, but includes one or more client stations that conform to the IEEE 802.11n Standard but not the first communication protocol.

The data unit 200 is similar to the data unit 100 of FIG. 5, but omits the legacy portion. Additionally, the VHT-STF 124 and the first VHT-LTF 128-1 occur before the VHT-SIG1s 116 and the VHT-SIG2s 120. Otherwise, the VHT-SIG1s 116, the VHT-SIG2s 120, the VHT-STF 124, and the VHT-LTFs 128 are the same as described above with respect to FIGS. 5 and 6. For example, in an embodiment in which the modulations in VHT-SIG fields in FIG. 9 are as in FIG. 7B or 7C, a legacy client configured according to the IEEE 802.11n Standard will interpret the VHT-SIG1s 116 and the VHT-SIG2s 120 as HT-SIG1s and HT-SIG2s, but will generate a CRC error. In another embodiment, when the modulations in VHT-SIG fields in FIG. 9 are as in FIG. 7D, a legacy client configured according to the IEEE 802.11n Standard will interpret the VHT-SIG1s 116 and the VHT-SIG2s 120 as L-SIGs and HT-SIG1s respectively, but will generate a CRC error. In general, the Greenfield data unit 200 is designed for utilization in a network having only devices that conform to the first communication protocol, and not including any legacy devices. In some situations, however, the Greenfield data unit 200 may be transmitted in a network having one or more legacy devices.

Figure 10:
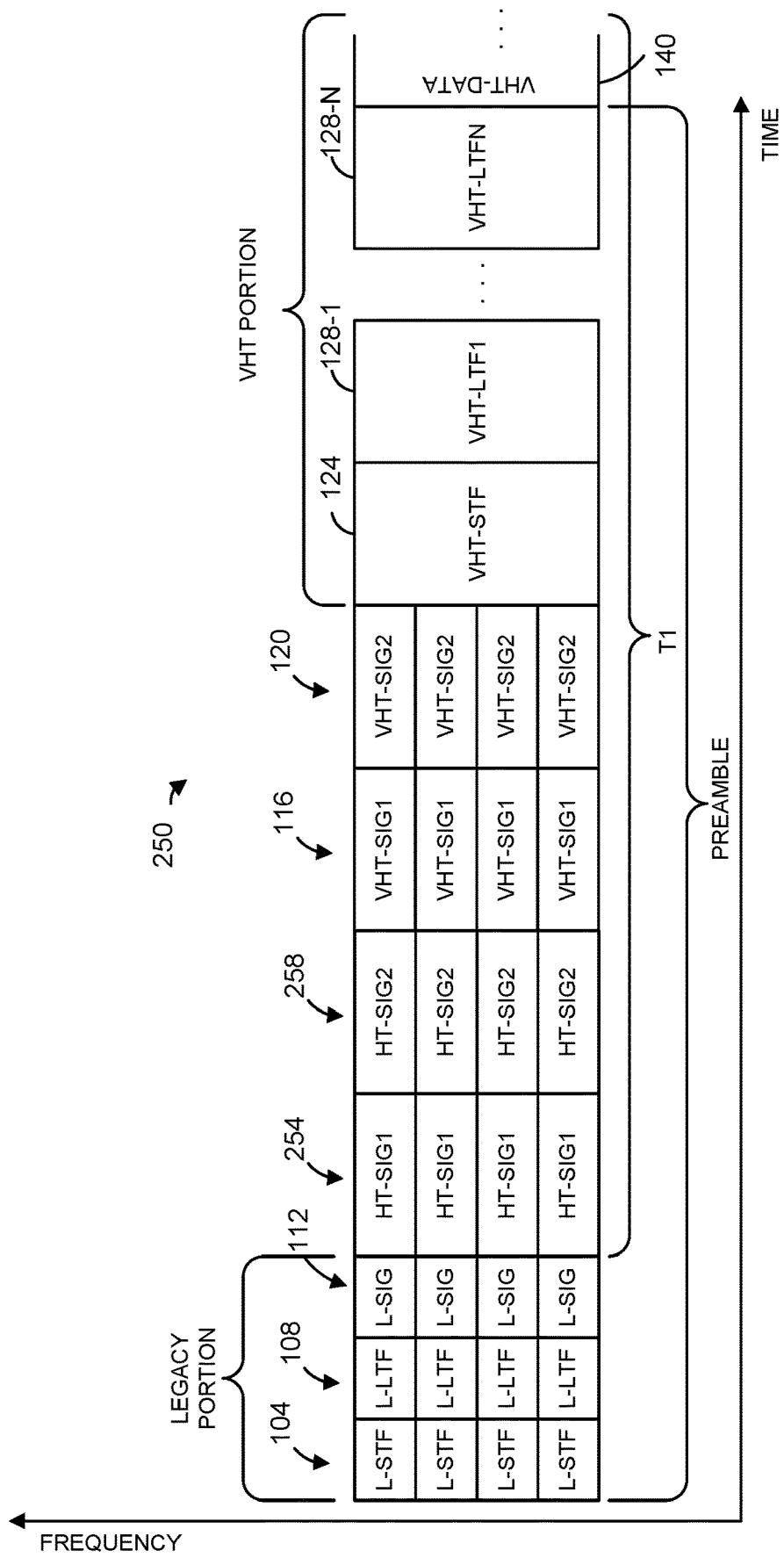
FIG. 10 is a diagram of another example data unit format, according to an embodiment.

FIG. 10 is a diagram of an OFDM data unit 250 that the AP 14 is configured to transmit to the client station 25-1, according to an embodiment. In an embodiment, the client station 25-1 is also configured to transmit the data unit 250 to the AP 14. The data unit 250 conforms to the first communication protocol and occupies an 80 MHz band. In other embodiments, data units similar to the data unit 200 occupy different bandwidths such as 20 MHz, 40 MHz, 120 MHz, 160 MHz, or any suitable bandwidth. Additionally, the 80 MHz band need not be contiguous, but may include two or more smaller bands, such as two 40 MHz bands, separated in frequency. The data unit 250 is suitable for "mixed mode" situations, i.e., when the WLAN 10 includes at least one client station (i.e., the legacy client station 25-4) that conforms to the IEEE 802.11a Standard and/or the IEEE 802.11n Standard, but not the first communication protocol. The data unit 250 can be utilized in other situations as well. For example, is some embodiments, the data unit 250 can be utilized i.e., when the WLAN 10 does not include any client stations that conforms to the IEEE 802.11a Standard but not the first communication protocol, but includes one or more client stations that conform to the IEEE 802.11n Standard but not the first communication protocol.

The data unit 250 is similar to the data unit 100 of FIG. 5, but includes HT-SIG1s 254 and HT-SIG2s 258. Further, the rate and length fields in the L-SIGs are set according to the duration T1, which includes the HT-SIG1s 254 and the HT-SIG2s 258.

In an embodiment, the "HT-Length" field, the "MCS" field, the space-time coding block (STBC) field, etc., in the HT-SIG1 254 are set so that a device configured according to the IEEE 802.11n Standard will compute the true duration of the data unit 250. In an embodiment, the "reserved" bit in the HT-SIG1s 254 and/or the HT-SIG2s 258 is set to "0" to signal devices that conform to the first communication protocol that the data unit 250 conforms to the first communication protocol. Additionally, when the "reserved" bit in the HT-SIG2s 258 is set to "0", a device configured according to the IEEE 802.11n Standard will determine "carrier lost" after decoding HT-SIG2. According to the state machine defined in the IEEE 802.11n Standard, the 802.11n device will hold CCA until the end of the duration computed according to the "HT-Length" field, the "MCS" field, the STBC field, etc.

The VHT-SIG1s 116 and the VHT-SIG2s 120 have a different format than the HT-SIG1s 254 and the HT-SIG2s 258, in an embodiment.

Figure 11:
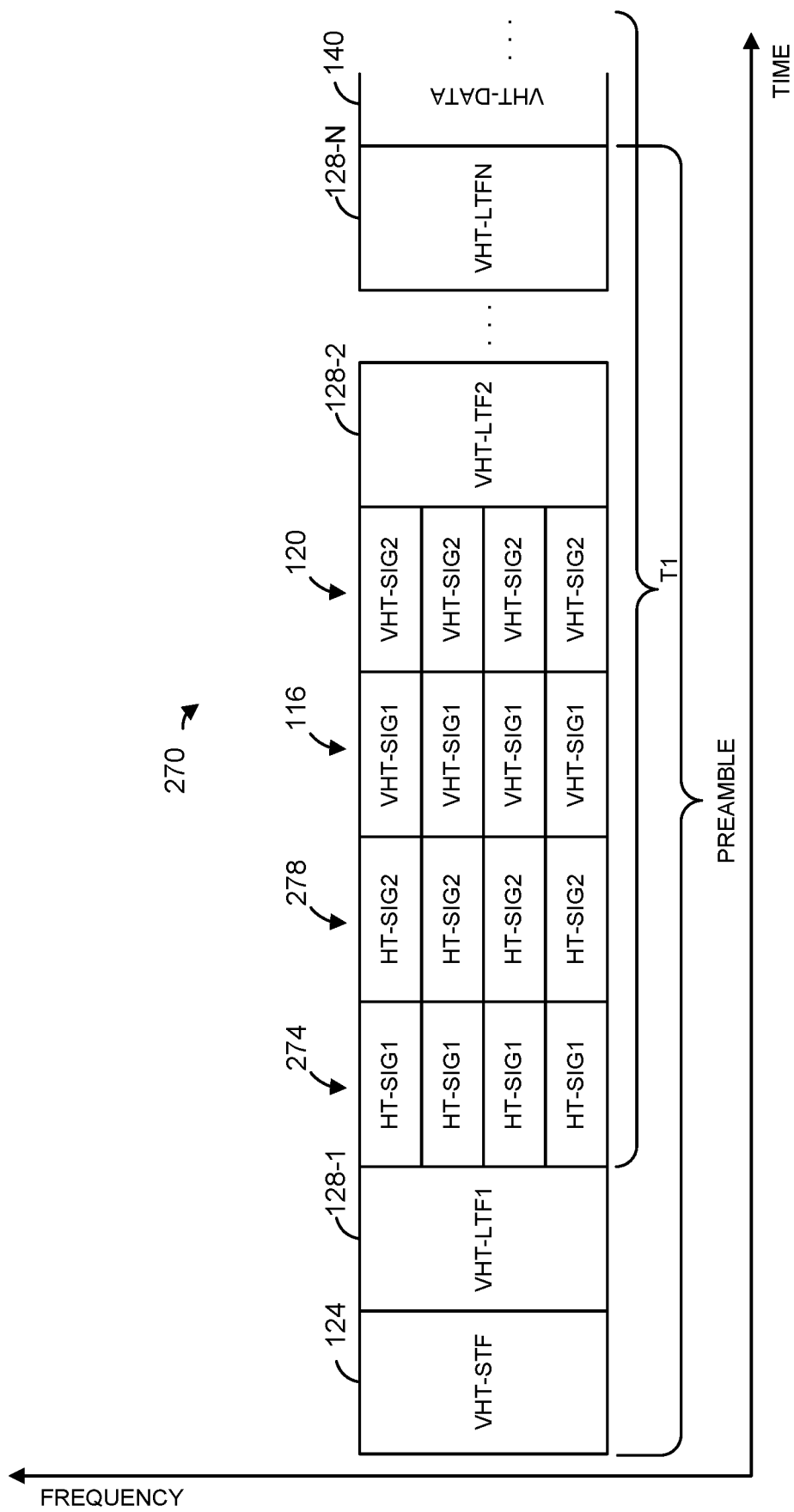
FIG. 11 is a diagram of another example data unit format, according to an embodiment.

FIG. 11 is a diagram of an OFDM data unit 270 that the AP 14 is configured to transmit to the client station 25-1, according to an embodiment. In an embodiment, the client station 25-1 is also configured to transmit the data unit 270 to the AP 14. The data unit 250 conforms to the first communication protocol and occupies an 80 MHz band. In other embodiments, data units similar to the data unit 200 occupy different bandwidths such as 20 MHz, 40 MHz, 120 MHz, 160 MHz, or any suitable bandwidth. Additionally, the 80 MHz band need not be contiguous, but may include two or more smaller bands, such as two 40 MHz bands, separated in frequency. The data unit 270 is suitable for "mixed mode" situations in which the WLAN 10 includes at least one client station (i.e., the legacy client station 25-4) that conforms to the IEEE 802.11n Standard, but not the first communication protocol, but the WLAN 10 does not include any client stations that conforms to the IEEE 802.11a Standard but not IEEE 802.11n Standard and not the first communication protocol. The data unit 270 can be utilized in other situations as well.

The data unit 270 is similar to the data unit 200 of FIG. 9, but includes HT-SIG1s 274 and HT-SIG2s 278. The HT-SIG1s 274 and HT-SIG2s 278 are configured the same as the HT-SIG1s 254 and HT-SIG2s 258 described with reference to FIG. 10, according to an embodiment. The VHT-SIG1s 116 and the VHT-SIG2s 120 have a different format than the HT-SIG1s 274 and the HT-SIG2s 278, in an embodiment.

The example data unit formats and signaling approaches (e.g., L-SIG subfield (reserved bit) changes from the IEEE 802.11a and the IEEE 802.11n Standards, VHT-SIG subfield changes, and modulation changes from HT-SIG in the IEEE 802.11n Standard) described in this disclosure may be used to signal to a device that conforms to the first communication protocol that the data unit conforms to the first communication protocol, that the data unit includes VHT-SIG fields, etc. For data units that conform to the first communication protocol and have a bandwidth less than 80 MHz (e.g., 40 MHz or 20 MHz), such data units can utilize a similar preamble. For 40 MHz wide data units, the data unit preamble that conforms to the first communication protocol has an upper frequency and lower frequency duplication structure similar to or the same as described in the IEEE 802.11n Standard, according to an embodiment.

In some embodiments similar to the embodiments described above with respect to FIGS. 5, 6, and 10, the "Rate" subfield in the L-SIG field is set to "1101" to indicate 6 megabits per second (Mbps), and the and set "Length" subfield is set according to T or T1, for legacy device spoofing. In these embodiments, a device that conforms to the IEEE 802.11a Standard will set CCA idle duration according to the L-SIG field. A device that conforms to the IEEE 802.11n Standard (also compatible with the IEEE 802.11a Standard) will assume that the data unit is a data unit that conforms to the IEEE 802.11a Standard, and will set CCA idle duration according to the L-SIG field. Devices that conform to the first communication protocol will determine that the data unit conforms to the first communication protocol by one or more of detecting the "reserved bit" in the L-SIG field, detecting the "reserved bit" in the VHT-SIG field, detecting modulation of the VHT-SIG fields, etc., depending on the particular embodiment.

In an embodiment in which the VHT-SIG1 field is modulated using BPSK as in FIG. 7D, a station that conforms to the first communication protocol will determine that the data unit does not conform to the IEEE 802.11n Standard, and that the current packet could be either an IEEE 802.11a data unit or a data unit that conforms to the first communication protocol. A station that conforms to the first communication protocol will determine that the OFDM symbol at the position of VHT-SIG1 could be either IEEE 802.11a data or a VHT-SIG1 conforming to the first communication protocol, but both are modulated using 6 Mbps (as indicated by L-SIG).

In embodiments in which signaling in VHT-SIG2 is utilized, after a station that conforms to the first communication protocol detects that the data unit conforms to the first communication protocol at VHT-SIG2 (e.g., with the modulation of FIG. 7D, in an embodiment), the device combines VHT-SIG1 and VHT-SIG2 decoded bits to check CRC and get PHY parameters, according to an embodiment.

In some embodiments, MAC protection of transmission of Greenfield data units are utilized within a basic service set (BSS).

If there are two or three OFDM symbols in VHT-SIG (e.g., a VHT-SIG1 and a VHT-SIG2, and a VHT-SIG3 in some embodiments), a device conforming to the first communication protocol can differentiate a green field data unit such as shown in FIGS. 9 and 11 from an IEEE 802.11n Standard mixed mode data unit, by comparing the modulations at the position of VHT-SIG fields, according to some embodiments.

Figure 12A:
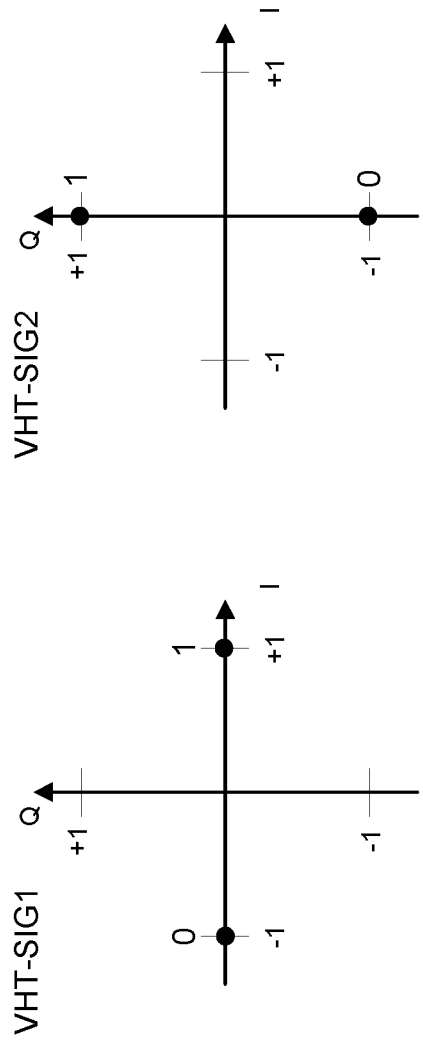
FIGS. 12A and 12B are diagrams of modulation used to modulate symbols in two example data units, according to an embodiment.
Figure 12B:
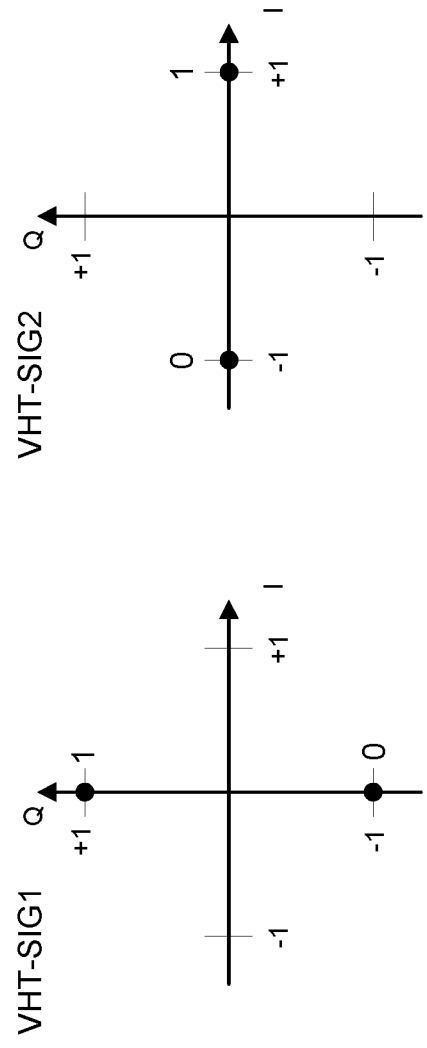

In some embodiments, VHT-SIG modulation in mixed mode and Greenfield mode are different. FIGS. 12A and 12B are diagrams that illustrate modulation of the VHT-SIG fields in mixed mode and Greenfield mode, respectively, according to one embodiment. In the embodiment of FIGS. 12A and 12B, VHT-SIG1 and VHT-SIG2 are modulated using BPSK and Q-BPSK, respectively, in mixed mode, whereas VHT-SIG1 and VHT-SIG2 are modulated using Q-BPSK and BPSK, respectively, in Greenfield mode. FIGS. 12A and 12B may be applied for the modulations of the VHT-SIG fields in FIGS. 5 and 6 for mixed mode, and FIGS. 9 and 11 for Greenfield.

In the above mentioned VHT signaling (i.e., signaling a data unit conforms to the first communication protocol) approaches in non HT-spoofing modes (i.e., not spoofing IEEE 802.11n Standard data units), and in some embodiments, the modulations of VHT_SIG fields are the same as the HT SIG fields in the IEEE 802.11n Standard, but the content of VHT_SIG fields will be different from HT-SIG of the IEEE 802.11n Standard, so that a device conforming to the IEEE 802.11n Standard will determine an error in the IEEE 802.11n Standard CRC check of the VHT-SIG fields (i.e., the IEEE 802.11n Standard device will perform a CRC check on the VHT-SIG fields assuming they are HT-SIG fields). For example, in one embodiment, more than 2 VHT-SIG symbols are utilized, so the CRC for the first communication protocol is redesigned to cover all of the more than two VHT-SIG fields. In another embodiment, the position/length/coding method (e.g. the initial states of the CRC logic) of the CRC bits in VHT-SIG1 and 2 are replaced, and the content of the VHT-SIG fields is different from HT-SIG fields.

Figure 13:
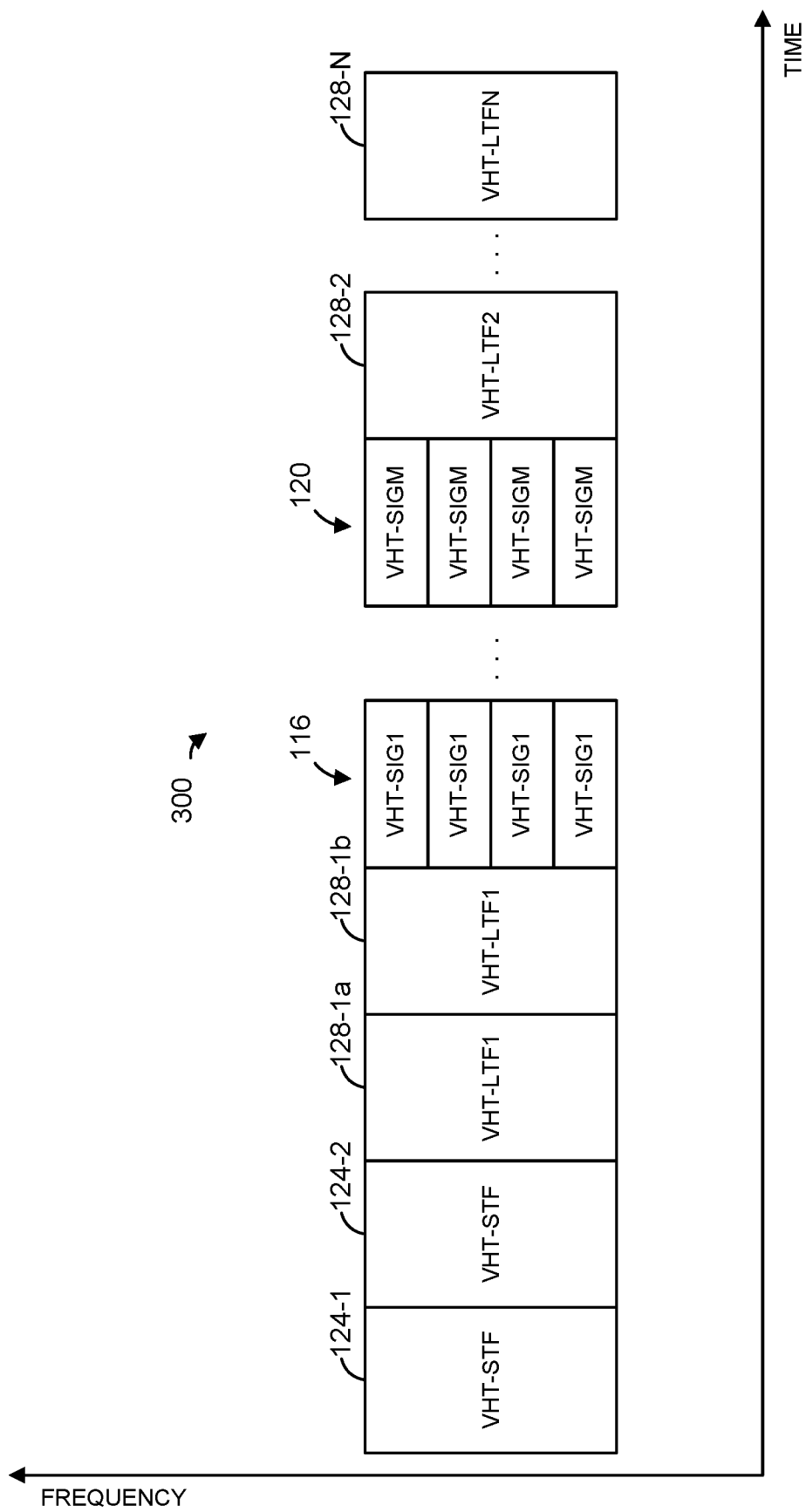
FIG. 13 is a diagram of another example data unit format, according to an embodiment.

In some embodiments, the VHT-STF and/or one or more VHT-LTF symbols may be repeated two or more times (e.g., for the purpose of more reliable channel estimation, frequency synchronization, automatic gain control (AGC) refinements, etc.). For example, in Greenfield mode data units, the VHT-STF and the first VHT-LTF symbol may be repeated two times each as shown in FIG. 13, which is preamble 300, according to an embodiment. The preamble 300 is similar to the preamble of FIG. 9, but includes two VHT-STFs 124-1, 124-2, two VHT-SIG1s, 128-1a, 128-1b, and M VHT-SIG fields, where M is an integer greater than or equal to two.

Figure 14:
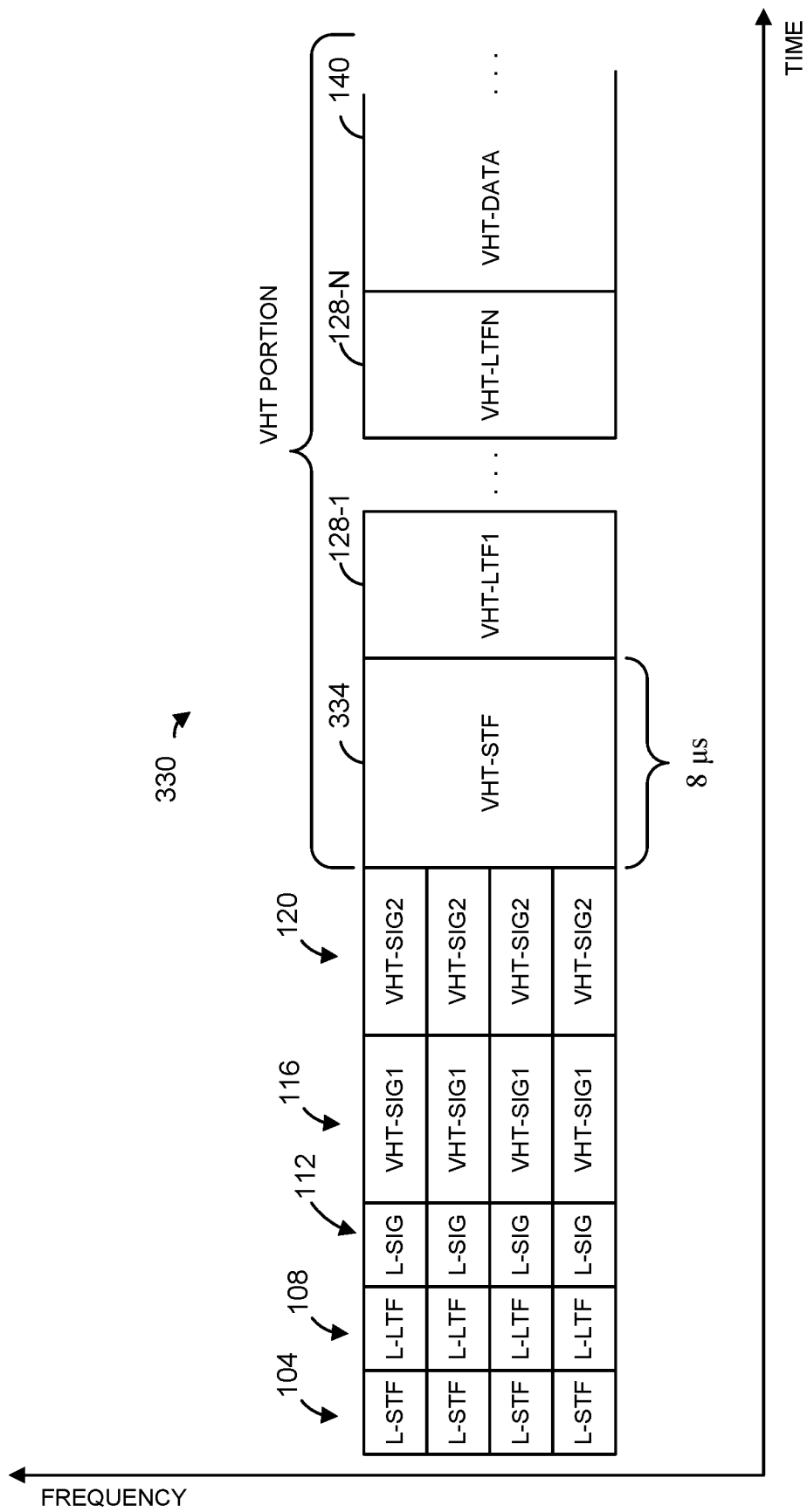
FIG. 14 is a diagram of another example data unit format, according to an embodiment.
Figure 15:
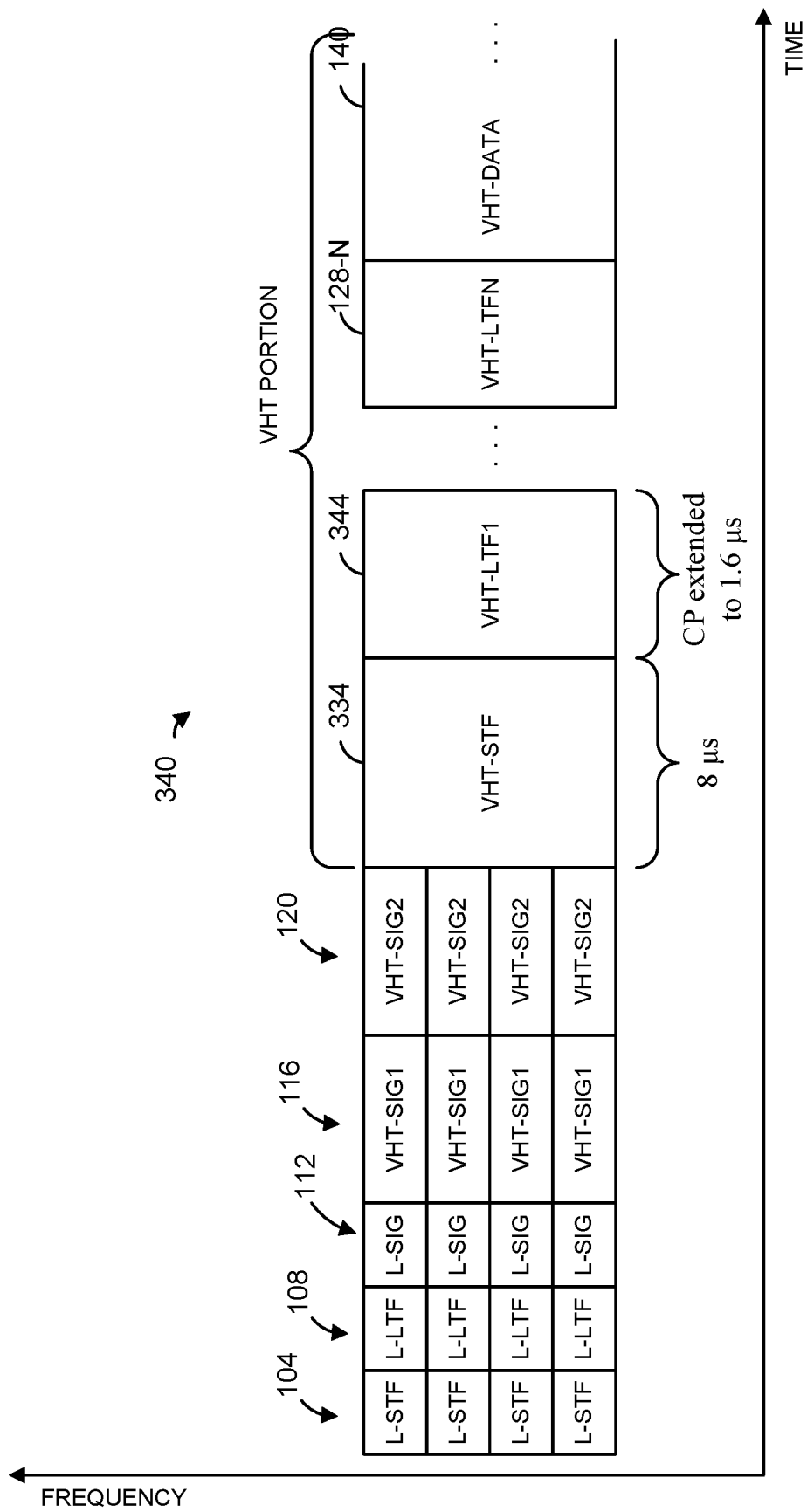
FIG. 15 is a diagram of another example data unit format, according to an embodiment.
Figure 16:
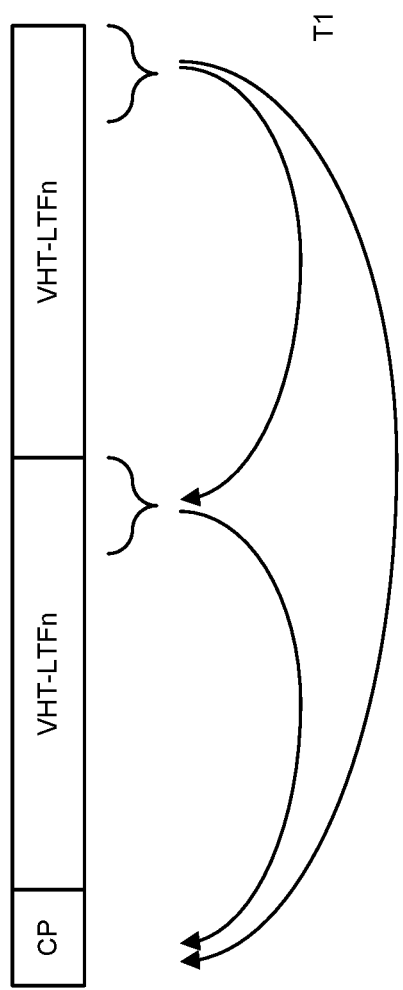
FIG. 16 is a diagram of an example field used in a data unit, according to an embodiment.

In some embodiments, the VHT-STF and/or one or more VHT-LTF symbols may be extended beyond 4 µs. For example, in some embodiments, the VHT-STF is extended to 8 µs. FIG. 14 is a Fig diagram of an OFDM data unit 330 that the AP 14 is configured to transmit to the client station 25-1, according to an embodiment. The data unit 330 is similar to the data unit 100 of FIG. 5, but with a VHT-STF field 334 that is extended to 8 µs. Additionally, in some embodiment, a cyclic prefix (CP) of one or more VHT-LTF symbols is extended to 1.6 µs. FIG. 15 is a diagram of an OFDM data unit 340 that the AP 14 is configured to transmit to the client station 25-1, according to an embodiment. The data unit 340 is similar to the data unit 330 of FIG. 14, but with a first VHT-LTF field 344 that includes a CP extended to 1.6 µs. In some embodiments, repetition of VHT-STF and/or VHT-LTFs is similar to repetition of the L-LTF field as described in the IEEE 802.11n Standard. For example, a single CP (e.g. 0.8 µs) or double-length CP (1.6 µs) is followed by two repetitions of an OFDM symbol of VHT-STF or VHT-LTF. FIG. 16 is a diagram illustrating repetition of two VHT-LTF symbols with a single CP for the two VHT-LTF symbols. The CP is 0.8 µs in some embodiments, and is 1.6 µs in other embodiments.

In some embodiments, the training sequences used for the VHT-STF and the VHT-LTFs are defined differently from those in the IEEE 802.11n Standard. For example, if in VHT-STF and/or VHT-LTF, a pilot $P_{s,n}^{(k)}$ is transmitted on the k-th subcarrier for the n-th training symbol at the s-th spatial stream, the VHT-STF and/or the VHT-LTF can be expressed as (expression before spatial mapping) $P^{(k)}s(k)$, where s(k) is the training STF or LTF symbol at the k-th subcarrier. The matrix $P^{(k)}$ used for the k-th subcarrier may be any invertible matrix that is known at both the transmitter and the receiver. As just one example of a P matrix, the P vectors for different streams are interleaved in the same VHT-LTF. In another example of a P matrix, in the embodiment of repeated VHT-STFs and/or VHT-LTFs, columns of the P matrix are repeated x times, if x-time repetition is applied for the VHT-STFs or VHT-LTFs.

In some embodiments, one or more of space division multiple access (SDMA), orthogonal frequency domain multiple access (OFDMA), etc., may be utilized in the first communication protocol. In these embodiments, one or more VHT-SIG fields contain subfield(s) that indicate whether the data unit is part of an SDMA/OFDMA transmission (e.g., whether the VHT-SIG field corresponds to one subspace of SDMA, or one sub-band of OFDMA). In the case of SDMA or OFDMA transmissions, all of the intended receivers should hold their respective CCAs until the end of transmission of the entire data unit, and should not send acknowledgment (ACK) data units until the end of the entire data unit. Since the different data streams in the data unit to the different receivers may have different lengths, the CCA should be held high till the end of the longest data stream.

In an embodiment, the transmitter indicates the duration of the longest data stream in the data unit in the LENGTH field of the L-SIG in mixed mode, or in a subfield of a VHT-SIG in Greenfield mode. The mentioned subfield in VHT-SIG indicates to the receiver that the current packet is part of an SDMA or OFDMA data unit, so the receiver should hold CCA for appropriate amount of time (e.g. according to the duration as indicated in length field in L-SIG in mixed mode). In another embodiment, MAC signaling is utilized to inform the receiver of the entire length of the SDMA/OFDMA data unit.

Figure 17:
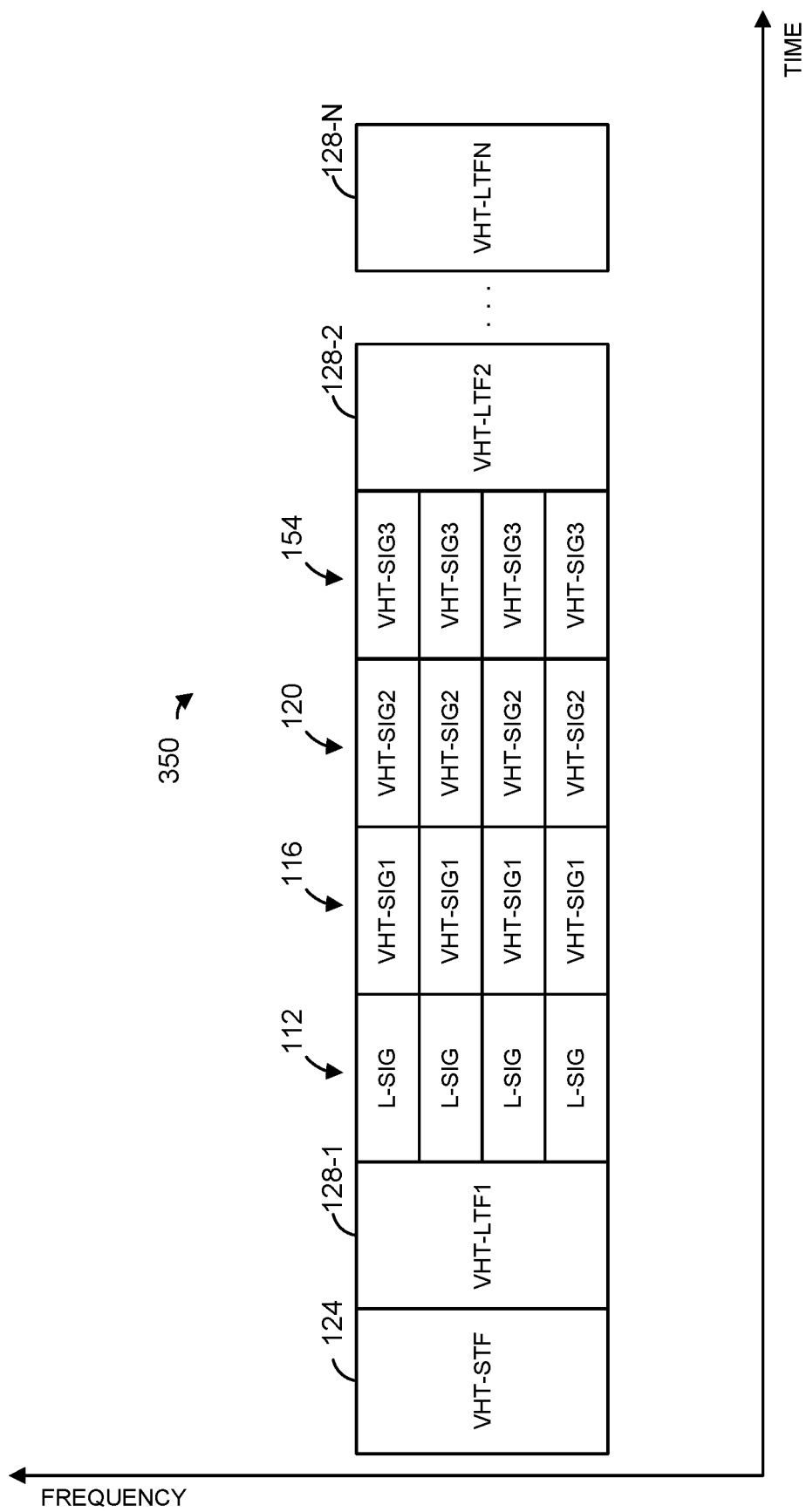
FIG. 17 is a diagram of another example data unit format, according to an embodiment.

Compared with the mixed mode preamble in the IEEE 802.11n Standard, the preamble of at least some data units conforming to the first communication protocol may be made shorter, but still backward compatible with the IEEE 802.11a and IEEE 802.11n Standards. In an embodiment, a Greenfield-like preamble is utilized, but with L-SIG fields inserted before the VHT-SIG fields. FIG. 17 is a diagram of an example preamble, according to an embodiment. L-SIG fields inserted before the three sets of VHT-SIG fields. In another embodiment, the VHT-SIG3 fields are omitted. In the data unit 350, the modulations of the VHT-SIG fields is the same as those described in FIGS. 5 and 6, e.g., as illustrated in FIGS. 7B-7E, in various embodiments. In an embodiment, the spatial mapping approach of L-SIG is in the same way as VHT-SIG field (e.g. the single stream L-SIG is mapped to NTX transmit antennas by a matrix QP1, where Q is the spatial mapping matrix applied to the VHT data, and P1 is the first column of the P matrix as introduced above or as in the IEEE 802.11n Standard), and the modulation/coding of L-SIG is the same as the SIG field of the IEEE 802.11a Standard. In this embodiment, a receiver can use VHT-LTF1 as the channel estimation to demodulate the L-SIG field, as it does on demodulating VHT-SIG field for the example Greenfield mode preambles described above. In one embodiment, devices that transmit data units according to the first communication protocol utilize data unit preambles such as in FIG. 17 for Greenfield mode. In one embodiment, "spoofing" is applied by the duration T1 (determined according to rate and length fields in L-SIG, and the reserved bit of L-SIG is set to 1 to signal that the data unit conforms to the first communication protocol. In other embodiments, various modulation and numbers of OFDM symbols of VHT-SIG fields, and the format/length of VHT-STF and VHT-LTF fields such as described above are utilized.

In embodiments utilizing a preamble such as in FIG. 17, and if the LTS symbol duplicates 20 MHz L-LTS symbols in each 20 MHz sub-band and non-zero values are utilized in the tones corresponding to IEEE 802.11n Standard legacy "DC/Guard tones" in each sub-band of L-LTS, then a receiver, when decoding L-SIG and VHT-SIG in one or more 20 MHz sub-bands will assume an IEEE 802.11a data unit of rate 6 Mbps (assuming the SIG fields set rate to 6 Mbps), and will determine worse channel estimation quality at tones around "DC" and "Guard band" in each sub-band, due to the non-zero values in "DC/Guard tones" at VHT-LTF1. In particular, the non-zero "DC" may be more problematic.

In some embodiments, to improve the detection of SIG fields, zero values are kept at the "DC" tones and/or "Guard" tones in each of the sub-bands of the LTS symbols in each of the VHT-LTF fields, and also not to transmit data in these tones in the Data field (VHT portion). In these embodiments, SIG field decoding quality will tend to be improved, at the expense of a lower data rate. On the other hand, a benefit of a short mixed mode preamble compared with the other embodiments is obtained.

In some embodiments, various preamble structures such as described above, are modified by including one or more VHT-SIG symbols after any VHT-LTF (e.g., VHT-LTF1, or VHT-LTF2, . . . VHT-LTFN). In some embodiments, signaling of VHT-LTF length by other VHT-SIG field(s) that are placed after L-SIG in mixed mode, or after VHT-LTF1 in Greenfield, is utilized. In other embodiments, VHT-SIG symbols occur after VHT-LTF1. If a VHT-SIG occurs after VHT-LTFn, then it can be spatially mapped the same way as VHT-LTFn (e.g., by vector QPn) or the same way as VHT-LTF1 (e.g. by vector QP1) so the receiver can use the channel estimation from VHT-LTFn or VHT-LTF1 to decode this VHT-SIG block after VHT-LTFn. These techniques can be utilized in either in mixed mode or Greenfield formats. In some embodiments, a benefit is that SDMA downlink transmissions can differentiate VHT-SIG fields for different users by beam-steering, while keeping the legacy portion of mixed mode packet unsteered (e.g., "omni-directional"). In some embodiments, different VHT-SIG symbols are located in unsteered and steered portions of the preamble, such as described below.

Figure 18:
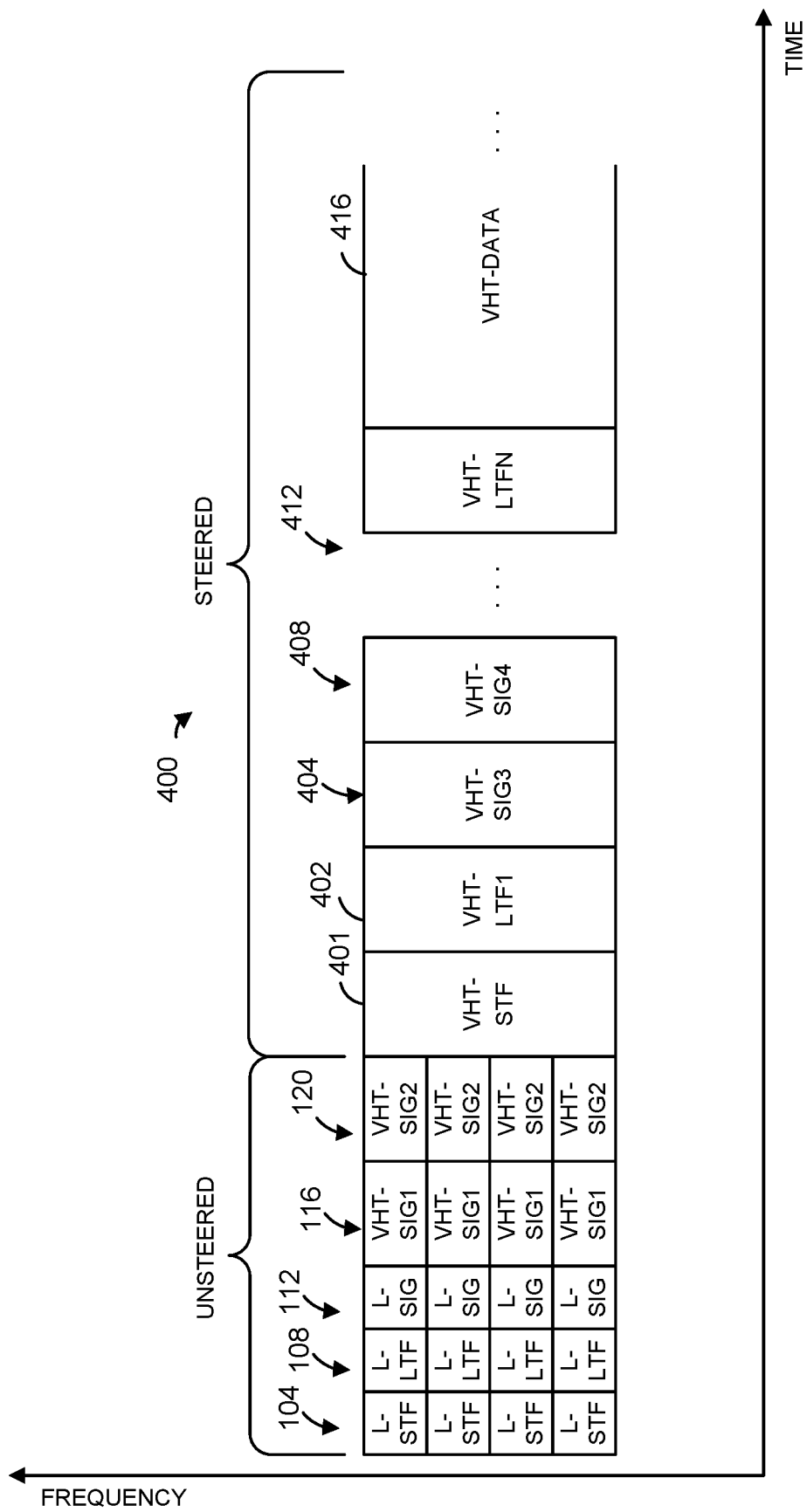
FIG. 18 is a diagram of another example data unit format, according to an embodiment.

FIG. 18 is a diagram of an example data unit 400 for use in embodiments in which the first communication protocol supports downlink SDMA (DL-SDMA). A first portion of the data unit 400 includes L-STF, L-LTF, L-SIG, VHT-SIG1, and VHT-SIG2 fields. The first portion is transmitted omni-directional and includes the same information for all client devices, in an embodiment. A second portion of the data unit 400 includes a VHT-STF field 401, a VHT-LTF1 field 402, a VHT-SIG3 field 404, a VHT-SIG4 field 408, VHT-LTF2 through VHT-LTFN fields 412, and a VHT data portion 416. At least some of the second portion includes different data for different client devices, wherein the different data is beamsteered to the different client devices.

In an embodiment, the VHT-SIG1 and VHT-SIG2 may be used to jointly signal the number of VHT-LTFs or the number of VHT-LTFs before the next block of VHT-SIG for all the SDMA users. In one embodiment, content of VHT-SIG1 and VHT-SIG2 are repetitions of L-SIG, or any other suitable signal. In another embodiment, the VHT-SIG1 and VHT-SIG2 are any suitable symbol that delivers any common information to all the users (e.g. common MAC information delivered from AP to all the users). In some embodiments described herein, a first block of VHT-SIG fields (e.g. VHT-SIG1 and VHT-SIG2 in FIG. 16) is referred to as VHT-SIGA, and a second block VHT-SIG fields (e.g. VHT-SIG3 and VHT-SIG4 in FIG. 16) is referred to as VHT-SIGB.

In an embodiment, the "reserved" bit in L-SIG is set to 1. VHT-SIG1 and VHT-SIG2 can be modulated such as described above. If VHT-SIG1 and VHT-SIG2 are modulated using BPSK or Q-BPSK, with r=1/2 binary convolutional code (BCC), this is the same as L-SIG or HT-SIG of the IEEE 802.11n Standard. In this embodiment, the VHT-SIG1 and VHT-SIG2 and/or the reserved bit in L-SIG permit spoofing and/or first communication protocol data unit detection such as described above.

In an embodiment and in some scenarios, content of VHT-SIG3 and VHT-SIG4 is different for different users, and is multiplexed by the steering matrix Q for different users.

Figure 19:
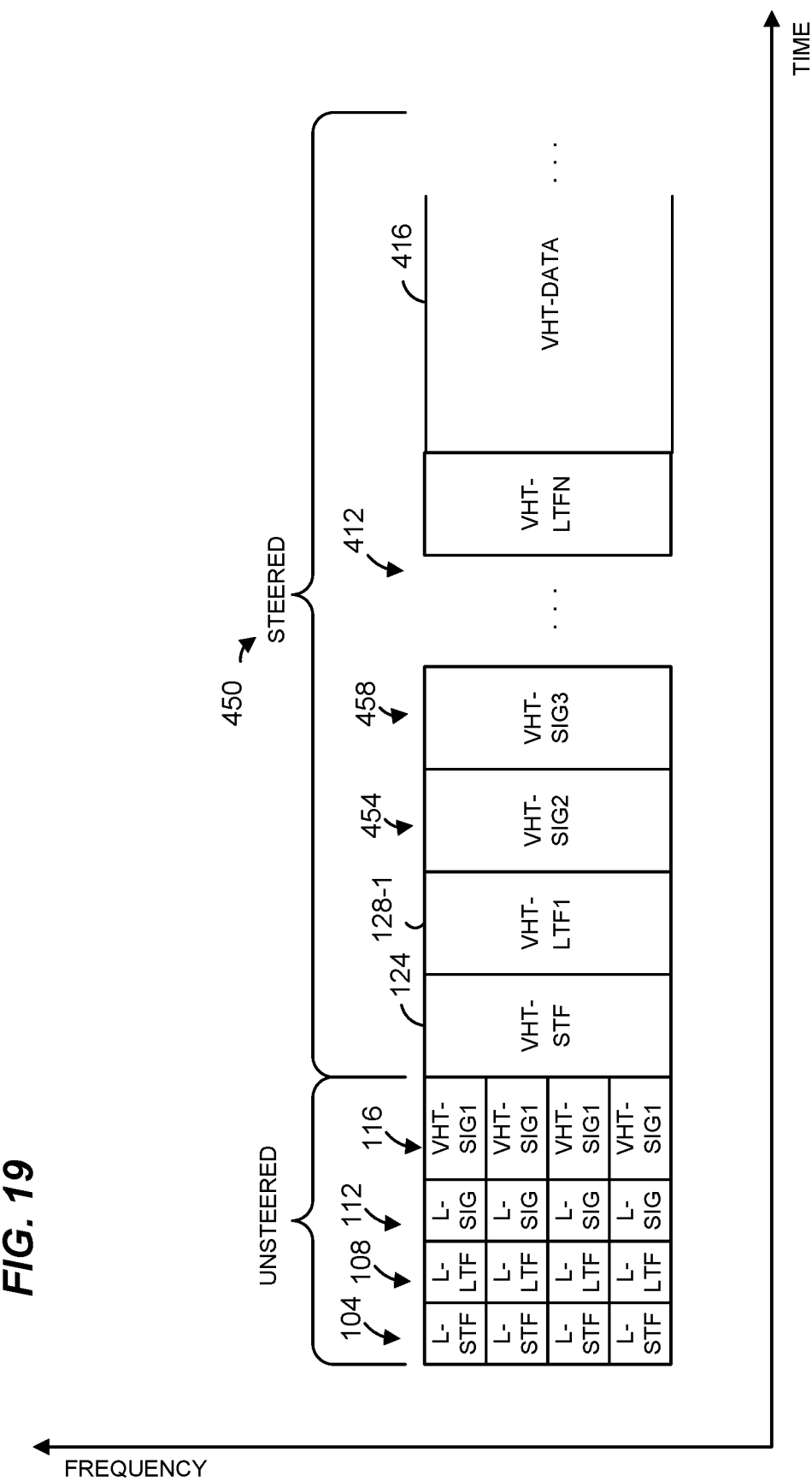
FIG. 19 is a diagram of another example data unit format, according to an embodiment.

FIG. 19 is a diagram of another example data unit 450 for use in embodiments in which the first communication protocol supports downlink SDMA (DL-SDMA). A first portion of the data unit 450 includes L-STF, L-LTF, L-SIG, and VHT-SIG1 fields. The first portion is transmitted omni-directional and includes the same information for all client devices, in an embodiment. A second portion of the data unit 400 includes VHT-STF, VHT-LTF1, a VHT-SIG2 field 454, a VHT-SIG3 field 458, the VHT-LTF2 through VHT-LTFN fields 412, and the VHT data portion 416. The second portion includes different data for different client devices, wherein the different data is beamsteered to the different client devices.

The data unit 450 is similar to the data unit 400, but one symbol shorter before the VHT-STF. In an embodiment, the "reserved" bit in L-SIG is set to 1, permitting first communication protocol data unit detection. VHT-SIG1 can be modulated such as described above. If VHT-SIG1 is modulated using BPSK, this permits spoofing and first communication protocol data unit detection. In an embodiment, content of VHT-SIG1 is a repetition of L-SIG, or any other suitable value.

FIG. 20 is a diagram of another example data unit 470 for use in embodiments in which the first communication protocol supports downlink SDMA (DL-SDMA). A first portion of the data unit 470 includes L-STF, L-LTF, L-SIG, HT-SIG1, and HT-SIG2 fields. The first portion is transmitted omni-directional and includes the same information for all client devices, in an embodiment. A second portion of the data unit 400 includes VHT-STF, VHT-LTF1, a VHT-SIG1 field 474, a VHT-SIG2 field 478, the VHT-LTF2 through VHT-LTFN fields 412, and the VHT data portion 416. The second portion includes different data for different client devices, wherein the different data is beamsteered to the different client devices.

The data unit 470 is similar to the data unit 400, but includes HT-SIG fields in the first portion. In this embodiment, the length field in HT-SIG is used to indicate the length of the data unit 470 for IEEE 802.11n spoofing.

In embodiments similar to those described above, the VHT-SIG blocks contain 3 OFDM symbols, conforming to all the previous cases where 3 OFDM symbols are needed for each VHT-SIG field. Also, in embodiments similar to those described above, the VHT-SIG placed after one VHT-LTF is applied regardless of DL-SDMA.

In the above mentioned examples in which two VHT-SIG blocks are present (e.g., one after L-SIG and the other after one of the VHT-LTFs), in some embodiments the two VHT-SIG blocks have different numbers of OFDM symbols. For example, the first VHT-SIG block has 3 symbols and second VHT-SIG block has 2 or 1 symbols. In another example, the first VHT-SIG block has 2 symbols and the second VHT-SIG block has 1 symbol.

In some embodiments that support DL-SDMA, the same preamble utilized regardless of DL-SDMA or not. In one embodiment of a non DL-SDMA case, the first VHT-SIG block signals the PHY information. In this embodiment, in the DL-SDMA case, the first VHT-SIG block delivers common PHY information for all the DL-SDMA users (e.g., bandwidth, short GI, etc.), and the second VHT-SIG block includes user-specific PHY information (e.g., MCS, length, etc.). In some embodiments, other fields are omitted in the second VHT-SIG block (e.g., sounding, extension, VHT-LTFs, etc.), so the second VHT-SIG block can be shorter than the first VHT-SIG block.

In one embodiment, the first VHT-SIG block has 2 OFDM symbols, and the second VHT-SIG block has 1 OFDM symbol, and the same preamble is applied for both single user and SDMA. In this embodiment, the first VHT-SIG always signals common PHY information for all users regardless of single user or SDMA, and the second VHT-SIG block has user specific information in the case of SDMA. For example, the first VHT-SIG block includes Length, GI Length, Bandwidth, Coding Type, Non-Sounding, number of VHT-LTFs (or 1 bit for whether only single VHT-LTF is present for single user case), BCC Tail, CRC, according to an embodiment. On the other hand, the second VHT-SIG block includes MCS, STBC type, smoothing, BCC Tail, CRC, according to an embodiment. In other embodiment, some of the above listed subfields are not present.

The IEEE 802.11n Standard specifies that, in mixed mode, the "Rate" subfield in L-SIG must be set to the lowest rate, i.e., 6 Mbps. The first communication protocol, on the other hand, sets the "Rate" subfield in L-SIG to rate specified in the IEEE 802.11a Standard other than 6 Mbps, according to an embodiment. In this embodiment, an IEEE 802.11n Standard compliant station, when decoding the L-SIG and finding Rate is not 6 Mbps, will automatically treat the packet as a legacy IEEE 802.11a packet, and set CCA according to the "Rate" and "Length" subfields in L-SIG. In an embodiment, one or more VHT-SIG symbols are modified for detection according to the first communication protocol, such as described above (e.g., the various modulation techniques described above).

In embodiments similar to all of the above-described examples, the number of tones delivering VHT-SIG in each of the VHT-SIG OFDM symbols is more than the number used in L-SIG. For example, 52 data tones are used in each of the VHT-SIG OFDM symbols, whereas 48 data tones are used in L-SIG and HT-SIG (if utilized), in some embodiments. In an embodiment, the same tone mapping as in the IEEE 802.11n Standard for 20 MHz and MCS0 is utilized. In this embodiment, four more bits can be delivered for VHT-SIG in each of the VHT-SIG OFDM symbols. In an embodiment, the long training field right before the VHT-SIG also sends non-zero training values (+−1) at these four additional tones.

Figure 21A:
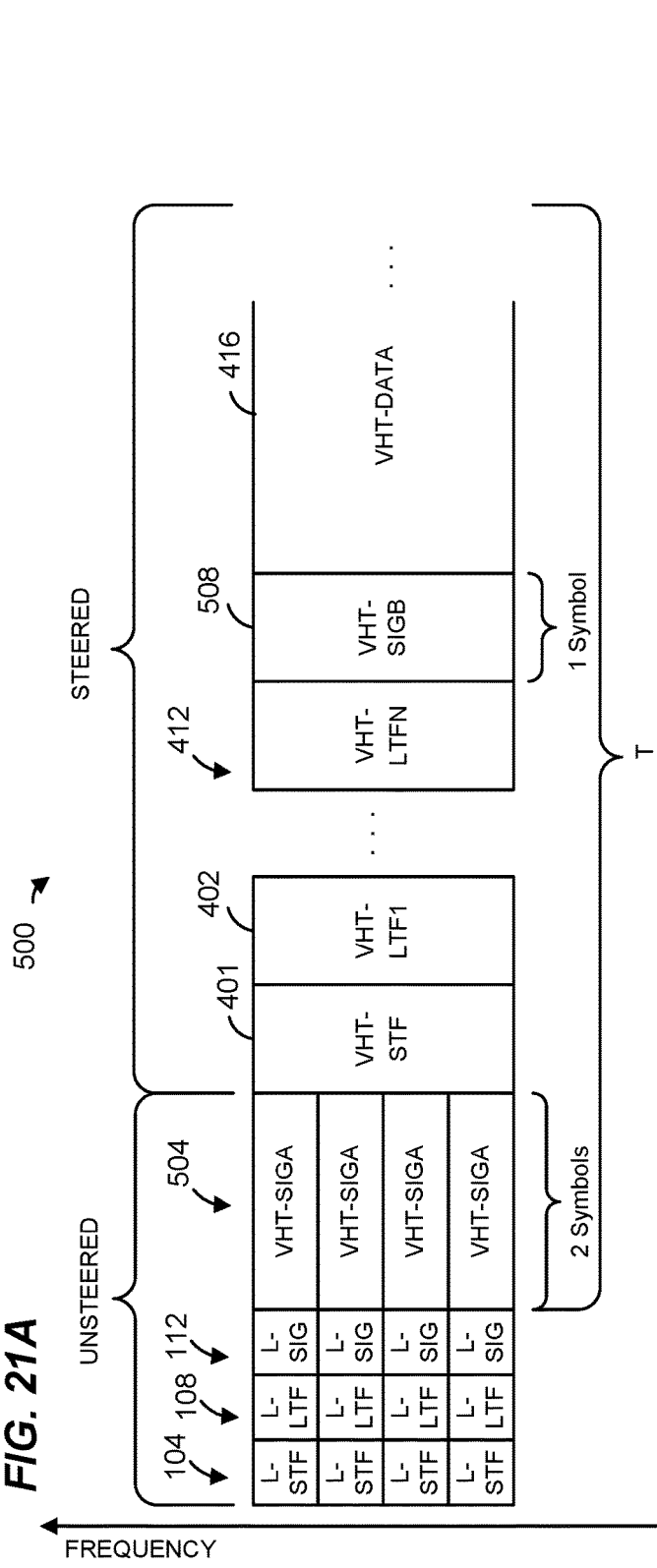
FIG. 21A is a diagram of another example data unit, according to an embodiment.

FIG. 21A is a diagram of another example data unit 500, according to an embodiment, that can be used in both DL-SDMA and non DL-SDMA scenarios. A first portion of the data unit 470 includes L-STF, L-LTF, L-SIG fields, and VHT-SIGA fields 504. A second portion includes VHT-STF, VHT-LTF1, the zero or more VHT-LTF2 through VHT-LTFN fields 412, a VHT-SIGB field 508, and the VHT data portion 416. In the non DL-SDMA case, the VHT data portion 416 includes data for a single device. In the DL-SDMA case, VHT-STF, VHT-LTF1, the VHT-LTF2 through VHT-LTFN fields 412, the VHT-SIGB field 508, and the VHT data portion 416 include different information for different client devices. In non-DL-SDMA cases, the first portion of the data unit 500 need not be steered differently than the second portion of the data unit 500 (e.g., need not be unsteered vs. steered).

Figure 21B:
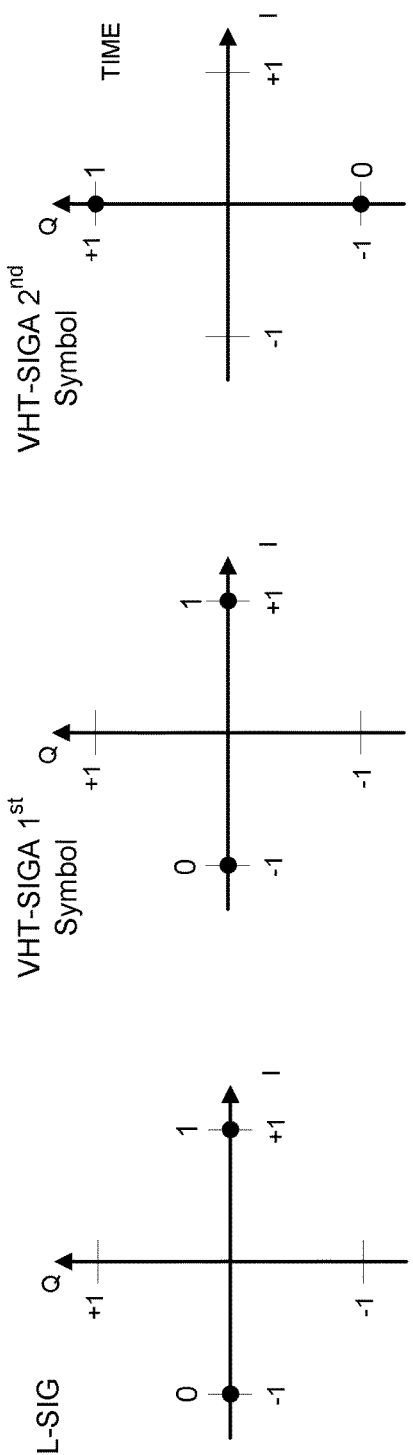
FIG. 21B are diagrams of modulation used to modulate symbols in the example data unit of FIG. 21A, according to an embodiment.

In an embodiment, the rate field in the L-SIG field is set to 6 Mbps, and the length field is set to indicate the duration T. In an embodiment, each VHT-SIGA field 504 includes two OFDM symbols: a first symbol and a second symbol. The VHT-SIGB field 508 has one OFDM symbol. FIG. 21B illustrates modulation applied to the L-SIG fields 112, the first symbols of the VHT-SIGA fields 504, and the second symbols of the VHT-SIGA fields 504.

The data unit 500 is an example data unit for an 80 MHz bandwidth transmission. The data unit 500 can be suitably modified for transmissions of different bandwidths as 20 MHz, 40 MHz, 160 MHz, etc.

In an embodiment, subfields of VHT-SIGA and VHT-SIGB are allocated regardless of whether single user or multiple user (e.g., SDMA) transmission is being utilized. In this embodiment, VHT-SIG-A includes two OFDM symbols VHT-SIG-B includes one OFDM symbol. In one example, 48 tones are utilized in both VHT-SIG-A and VHT-SIG-B. In another example, 52 tones are utilized in one or both of VHT-SIG-A and VHT-SIG-B.

In one specific embodiment, VHT-SIGA includes the following subfields: Length/Duration (16 bits) (can be defined in "number of OFDM symbols", for example); Bandwidth (2 bits); Coding Type (1 bit); Not Sounding (1 bit); Number of Extension VHT-LTFs (3 bits); Short GI (1 bit) (in one implementation, Short GI is not set to 1 in DL-SDMA if at least one user is utilizing a single stream, and at least one user is utilizing more than one stream); Single VHT-LTF? (1 bit) (in one implementation, early signaling of short GI with a single stream (MCS is in VHT-SIG-B), and is not set to 1 in downlink multi-user MIMO data units unless all users are with single stream); CRC (8 bits); BCC tail bits (6 bits). In one implementation, the VHT-SIGA includes a "reserved" subfield.

In one specific embodiment, VHT-SIGB includes the following subfields: the MCS (8 bits); Aggregation (1 bit); STBC (2 bits); Smoothing (1 bit); CRC (4 bits); BCC tail bits (6 bits). In one embodiment, the smoothing subfield is omitted. In one implementation, the VHT-SIGB includes a "reserved" subfield.

In one embodiment, the first symbol of VHT-SIGA is modulated using BPSK, whereas the second symbol of VHT-SIGA is modulated using Q-BPSK, as illustrated in FIG. 21B. In one embodiment, a faster clock as compared to the IEEE 802.11n Standard is utilized for transmitting the preamble. In an embodiment, VHT-STF is longer as compared to HT-STF of the IEEE 802.11n Standard, and/or longer the GI of VHT-LTF1 is longer as compared to the GI of HT-LTF1 of the IEEE 802.11n Standard. This provides for better AGC performance especially at a transmit beamformed, in some implementations. In one embodiment, a different modulation of the first OFDM symbol of VHT-SIGA is utilized as compared to the IEEE 802.11n Standard, so the IEEE 802.11n Standard HT detection will still fail, but a client station configured according to the first communication protocol can determine that the data unit conforms to the first communication protocol. For VHT-SIGA and/or VHT-SIGB, 48 or 52 tones are utilized, depending on the implementation, according to some embodiments.

In an embodiment, Q-BPSK is utilized on MQ data tones in the first symbol of VHT-SIG-A or both of the symbols of VHT-SIG-A, and BPSK is utilized on the remaining MI=48-MQ data tones. As just two examples, the (MQ, MI) tuple equals (24, 24) or (16, 32). In an embodiment, the different modulations are spread across the whole band to explore frequency diversity, e.g. by equal or substantially equal separations. The specific tone indices with the different modulations can be specified by the first communication protocol.

In this embodiment, a client station configured according to the first communication protocol can differentiate between first communication protocol data units, IEEE 802.11n Standard data units, and IEEE 802.11a Standard data units by comparing energy of Q-arm and I-arm across the 48 tones. This is equivalent to delivering 2 information bits by the 48 tones. A client station configured according to the IEEE 802.11n Standard, when receiving such a first communication protocol data unit, will fail detection of a HT IEEE 802.11n Standard data unit, and will thus treat the data unit as a IEEE 802.11a Standard data unit (i.e., L-SIG spoofing).

In another embodiment, the legacy portion of a preamble utilizes the 4 extra guard tones of the 20 MHz signal, which were allocated to the IEEE 802.11n Standard 20 MHz data signal, but not to the IEEE 802.11a 20 MHz signal. These 4 tones are not used to deliver data of VHT-SIG/L-SIG fields, but they are predefined to be non-zero symbols, e.g. in BPSK (+−1), or in Q-BPSK (+−j), in an embodiment. Whenever a first communication protocol receiver detects that there are signals on these 4 tones, and/or the detected symbols (after demodulation and slicing) matches the predefined symbols on these 4 tones, then the receiver determines that the data unit conforms to the first communication protocol.

In one embodiment, the data tones in the first OFDM symbol of VHT-SIG-A are modulated using BPSK, so IEEE 802.11a/11n receivers will treat the data unit as an 802.11a Standard data unit. In various embodiments, the 4 extra tones are applied in L-SIG only, or both L-SIG and VHT-SIG-A, or first OFDM symbol of VHT-SIG-A only, or L-SIG and first OFDM symbol of VHT-SIG-A, not in the remaining symbols of VHT-SIG, etc.

In these embodiments, the L-LTF also includes these 4 tones, which could be in the same way HT-GF-STF and GF-HT-LTF1 in green field mode of the IEEE 802.11n Standard 20 MHz signal. A receiver may detect the energy of these 4 tones across all the mentioned OFDM symbols (e.g. L-LTF, L-SIG, and 1st symbol of VHT-SIG-A), for detection of first communication protocol data units.

In embodiments in which VHT-SIG-B is placed after VHT-LTFn (e.g., after the last VHT-LTF, as in FIG. 21A), VHT-SIG-B is spatially mapped the same way as VHT-LTFn (e.g. by vector QPn) so a receiver can use the channel estimation from VHT-LTFn to decode VHT-SIG-B. In another embodiment, VHT-SIG-B is spatially mapped the same way as VHT-LTF1 (e.g. by vector QP1), so a receiver can use the channel estimation from VHT-LTF1 to decode VHT-SIG-B.

In some embodiments VHT-SIG-B is placed after VHT-LTFn (e.g., the first or the last VHT-LTF), no matter single user or multi-user packets. In other embodiments, VHT-SIG-B is placed after VHT-LTF1 for single user and after VHT-LTFn for multi-user cases (e.g. after the first VHT-LTF for single user, and after the last VHT-LTF for multi-user). In other embodiments, VHT-SIGB does not exist for single user, and is applied for multi-user. In other embodiments, VHT-SIGB does not exist regardless of single user or multi-user. In some embodiments, VHT-SIG-A includes a bit to indicate single user or multi-user, and a subfield to indicate a total number of VHT-LTFs (which may be utilized by a receiver to locate the position of VHT-SIG-B in embodiments and/or data units that include VHT-SIG-B).

In one specific embodiment, VHT-SIGA includes the following subfields: Length/Duration (16 bits or some other suitable number) (can be defined in "number of OFDM symbols", for example); Bandwidth (2 or more bits); Coding Type (1 bit); Not Sounding (1 bit); Smoothing (1 bit); Short GI (1 bit); CRC (8 bits); BCC tail bits (6 bits); a Number of Extension VHT-LTFs; Ness. In one implementation, the VHT-SIGA includes a "reserved" subfield.

In one specific embodiment, VHT-SIGB includes the following subfields: the MCS (any suitable number of bits); Aggregation (1 bit); STBC (any suitable number of bits); CRC (any suitable number of bits, but can be less than 8 bits in one implementation); BCC tail bits (6 bits). In one embodiment, the smoothing subfield is omitted from VHT-SIGA and included in VHT-SIGB. In one embodiment, the aggregation subfield is omitted from VHT-SIGB and included in VHT-SIGA. In one implementation, the VHT-SIGB includes a "reserved" subfield.

If VHT-SIG-B is always placed after the last VHT-LTF regardless single user or multi-user transmission, a number of spatial stream (Nss) and STBC can be signaled in VHT-SIG-A, according to an embodiment. In this embodiment, in DL-SDMA case, Nss and STBC are constrained to be common for all the clients.

Figure 22:
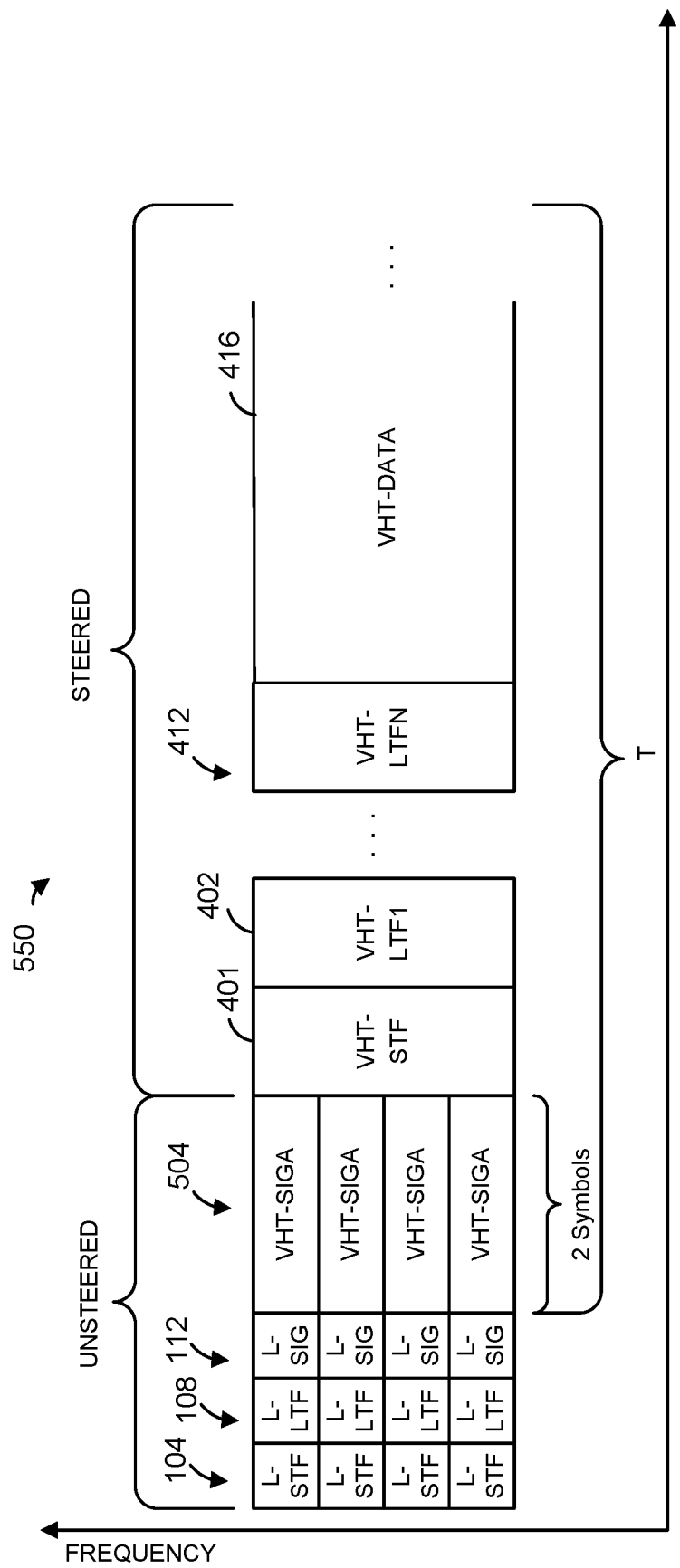
FIG. 22 is a diagram of another example data unit, according to an embodiment.

FIG. 22 is a diagram of another example data unit 550, according to an embodiment, that can be used in both DL-SDMA and non DL-SDMA scenarios. The data unit 550 is similar to the data unit 500 of FIG. 21A, but omits the VHT-SIGB field 508. The L-SIG fields 112 and the VHT-SIGA fields 504 are modulated according to FIG. 21B, in an embodiment. The data unit 550 is an example data unit for an 80 MHz bandwidth transmission. The data unit 550 can be suitably modified for transmissions of different bandwidths as 20 MHz, 40 MHz, 160 MHz, etc.

In some embodiments, the first communication protocol utilizes beamforming and/or downlink multi-user multiple input, multiple output (DL-MU-MIMO). In these embodiments, the communication devices in a network utilize sounding data units (also referred to as sounding packets) for beamforming and/or DL-MU-MIMO.

In some embodiments, a sounding data unit includes a preamble but omits a data portion. In one embodiment of a sounding data unit, sounding signals are included in the VHT-SIGB field. In other embodiments, the sounding data unit does not include the VHT-SIGB field.

In one embodiment, preambles of regular data units with data include VHT-SIGB. In a particular embodiment, preambles of regular data units with data include VHT-SIGB, whereas sounding data units do not include VHT-SIGB.

In one embodiment, the L-SIG field and/or the VHT-SIGA field and/or the VHT-SIGB field (if included) of a sounding data unit indicates that the data unit does not have a data portion. In another embodiment, the L-SIG field and/or the VHT-SIGA field and/or the VHT-SIGB field (if included) of a sounding data unit additionally or alternatively includes a "non-sounding" bit similar to the "non-sounding" bit in the HT-SIG field of the IEEE 802.11n Standard that indicates whether the data unit is a sounding data unit.

In embodiments in which preambles of regular data units include VHT-SIGB whereas the preambles of sounding data units do not include VHT-SIGB, a receiver determines whether VHT-SIGB is included in the preamble of a received data unit based on the data length and/or "non-sounding" information from the L-SIG and/or VHT-SIGA fields.

Figure 23:
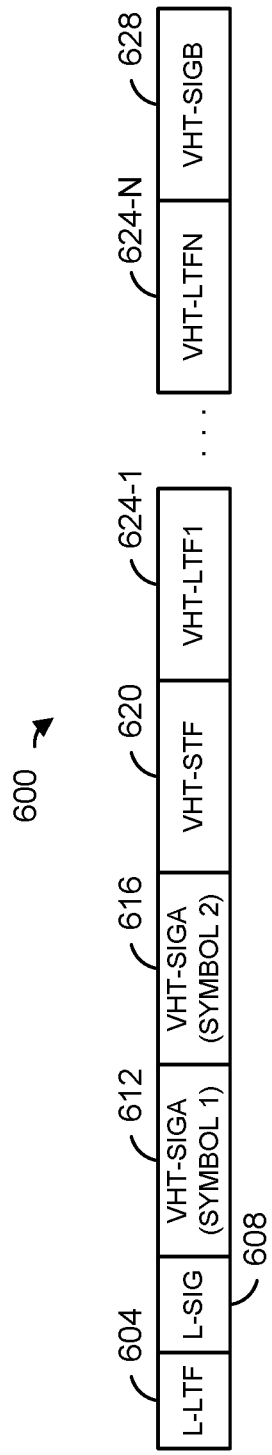
FIG. 23 is a diagram of an example sounding data unit, according to an embodiment.

FIG. 23 is a diagram of an example sounding data unit 600, according to an embodiment. The sounding data unit 600 omits a data portion. The sounding data unit 600 includes an L-LTF field 604, an L-SIG field 608, a VHT-SIGA field having a first symbol 612 and a second symbol

616. The sounding data unit 600 also includes a VHT-STF field 620, one or more VHT-LTF fields 624, and a VHT-SIGB field 628. In one embodiment, the L-SIG field 604 and/or the VHT-SIGA field 612, 616 and/or the VHT-SIGB field 628 indicates that the data unit does not have a data portion. In another embodiment, the L-SIG field 604 and/or the VHT-SIGA field 612, 616 and/or the VHT-SIGB field 628 additionally or alternatively include "non-sounding" information (i.e., a "non-sounding" bit) that indicates that the data unit 600 is a sounding data unit.

Figure 24:
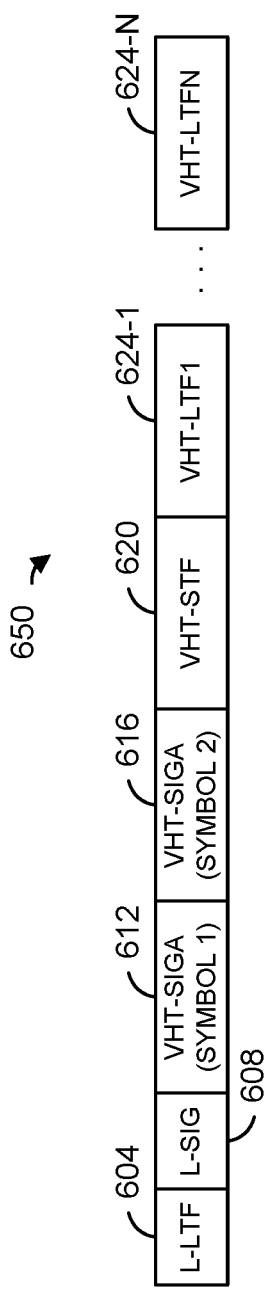
FIG. 24 is a diagram of another example sounding data unit, according to an embodiment.

FIG. 24 is a diagram of another example sounding data unit 650, according to an embodiment. The sounding data unit 650 is similar to the sounding data unit 600, but omits VHT-SIGB 628.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating and transmitting a physical layer (PHY) data unit for transmission via a communication channel, the PHY data unit conforming to a first communication protocol, the method comprising:
generating, at a communication device, the PHY data unit, including generating a first preamble, of the PHY data unit, that conforms to the first communication protocol, wherein the first preamble includes a legacy signal field that is formatted according to a second communication protocol, the first preamble includes a non-legacy signal field having a first orthogonal frequency division multiplexing (OFDM) symbol and a second OFDM symbol, the first OFDM symbol (i) immediately follows the legacy signal field and (ii) is modulated using binary phase shift keying (BPSK) modulation, whereas a third communication protocol specifies that, in a second preamble defined by the third communication protocol, a third OFDM symbol that immediately follows the legacy signal field formatted according to the second communication protocol is modulated using BPSK modulation rotated by 90 degrees (Q-BPSK), wherein the first communication protocol specifies modulation of the first OFDM symbol to be BPSK modulation to cause a receiver device that conforms to the third communication protocol to determine that the data unit does not conform to the third communication protocol, wherein the third communication protocol is legacy with respect to the first communication protocol, the second OFDM symbol (i) immediately follows the first OFDM symbol and (ii) is modulated using Q-BPSK to indicate to a receiver device that conforms to the first communication protocol that the data unit conforms to the first communication protocol, and the first preamble is generated to include further fields that follow the non-legacy signal field and that conform to the first communication protocol; and transmitting, with the communication device, the PHY data unit via the communication channel.

2. The method of claim 1, wherein generating the first preamble includes generating the legacy signal field such that the legacy signal field is decodable by i) receiver devices that conform to the second communication protocol but do not conform to the first communication protocol, and ii) receiver devices that conform to the third communication protocol but do not conform to the first communication protocol, to determine the duration of the PHY data unit using information in the legacy signal field.

3. The method of claim 2, wherein generating the first preamble includes generating the legacy signal field such that the legacy signal field includes a rate subfield and a length subfield that indicate the duration of the PHY data unit.

4. The method of claim 1, wherein generating the first preamble includes generating the non-legacy signal field according to a format that will cause a receiver device that conforms to the second communication protocol, and not the first communication protocol, to detect an error.

5. The method of claim 1, wherein generating the first preamble includes generating the non-legacy signal field according to a format that will cause a receiver device that conforms to the third communication protocol, and not the first communication protocol, to detect an error.

6. The method of claim 1, wherein modulating the first OFDM symbol using BPSK modulation causes receiver devices that conform to the third communication protocol, and not the first communication protocol, to assume that the PHY data unit conforms to the second communication protocol.

7. The method of claim 1, wherein:
the second communication protocol is a protocol defined by the IEEE 802.11a standard; and
the third communication protocol is a protocol, different from the protocol defined by the IEEE 802.11a standard, that is legacy with respect to the first communication protocol.

8. The method of claim 1, wherein:
the non-legacy signal field is a first signal field;
the further fields that follow the first signal field include:
a plurality of training fields, and
a second signal field that follows the plurality of training fields.

9. The method of claim 8, wherein transmitting the PHY data unit includes:
transmitting, with the communication device, a first portion of the PHY data unit without beamsteering, wherein the first portion includes the legacy signal field and the first signal field; and
transmitting, with the communication device, a second portion of the PHY data unit with beamsteering, wherein the second portion includes the second signal field.

10. The method of claim 1, wherein generating the PHY data unit further includes generating a payload of the PHY data unit.

11. An apparatus, comprising:
a wireless local area network (WLAN) physical layer (PHY) unit, the WLAN PHY unit implemented on one or more integrated circuit devices configured to generate a PHY data unit conforming to a first communication protocol, including generating a first preamble, of the PHY data unit, that conforms to the first communication protocol, wherein
the first preamble includes a legacy signal field that is formatted according to a second communication protocol,
the first preamble includes a non-legacy signal field having a first orthogonal frequency division multiplexing (OFDM) symbol and a second OFDM symbol,
the first OFDM symbol (i) immediately follows the legacy signal field and (ii) is modulated using binary phase shift keying (BPSK) modulation, whereas a third communication protocol specifies that, in a second preamble defined by the third communication protocol, a third OFDM symbol that immediately follows the legacy signal field formatted according to the second communication protocol is modulated using BPSK modulation rotated by 90 degrees (Q-BPSK), wherein the first communication protocol specifies modulation of the first OFDM symbol to be BPSK modulation to cause a receiver device that conforms to the third communication protocol to determine that the data unit does not conform to the third communication protocol, wherein the third communication protocol is legacy with respect to the first communication protocol,
the second OFDM symbol (i) immediately follows the first OFDM symbol and (ii) is modulated using Q-BPSK to indicate to a receiver device that conforms to the first communication protocol that the data unit conforms to the first communication protocol, and
the first preamble is generated to include further fields that follow the non-legacy signal field and that conform to the first communication protocol;
wherein the WLAN PHY unit includes one or more transceivers, implemented on the one or more integrated circuits, wherein the one or more transceivers are configured to transmit the generated data unit via a communication channel.

12. The apparatus of claim 11, wherein the one or more integrated circuit devices are configured to generate the legacy signal field such that the legacy signal field is decodable by i) receiver devices that conform to the second communication protocol, and ii) receiver devices that conform to the third communication protocol, to determine the duration of the PHY data unit using information in the legacy signal field.

13. The apparatus of claim 12, wherein the one or more integrated circuit devices are configured to generate the legacy signal field to include a rate subfield and a length subfield that indicate the duration of the PHY data unit.

14. The apparatus of claim 11, wherein the one or more integrated circuit devices are configured to generate the non-legacy signal field according to a format that will cause a receiver device that conforms to the second communication protocol, but not conform the first communication protocol, to detect an error.

15. The apparatus of claim 11, wherein the one or more integrated circuit devices are configured to generate the non-legacy signal field according to a format that will cause a receiver device that conforms to the third communication protocol, but not the first communication protocol, to detect an error.

16. The apparatus of claim 11, wherein modulating the first OFDM symbol using BPSK modulation causes receiver devices that conform to the third communication protocol, and not the first communication protocol, to assume that the PHY data unit conforms to the second communication protocol.

17. The apparatus of claim 11, wherein:
the second communication protocol is a protocol defined by the IEEE 802.11a standard; and
the third communication protocol is a protocol, different from the protocol defined by the IEEE 802.11a standard, that is legacy with respect to the first communication protocol.

18. The apparatus of claim 11, wherein:
the non-legacy signal field is a first signal field;
the further fields that follow the first signal field include:
a plurality of training fields, and
a second signal field that follows the plurality of training fields.

19. The apparatus of claim 18, wherein the PHY unit is configured to:
transmit a first portion of the PHY data unit without beamsteering, wherein the first portion includes the legacy signal field and the first signal field; and
transmit a second portion of the PHY data unit with beamsteering, wherein the second portion includes the second signal field.

20. The apparatus of claim 11, wherein the one or more integrated circuit devices are configured to generate a payload of the PHY data unit.

21. The apparatus of claim 11, further comprising:
one or more antennas coupled to the one or more transceivers.

* * * * *